US009910208B2

(12) United States Patent
Bang et al.

(10) Patent No.: US 9,910,208 B2
(45) Date of Patent: Mar. 6, 2018

(54) THIN FILM TYPE CONTROLLED VIEWING WINDOW BACK LIGHT UNIT AND THIN FLAT TYPE CONTROLLED VIEWING WINDOW DISPLAY USING THE SAME

(71) Applicants: LG DISPLAY CO., LTD., Seoul (KR); BAYER MATERIALSCIENCE AG, Leverkusen (DE)

(72) Inventors: Hyungseok Bang, Goyang-si (KR); Seungman Ryu, Paju-si (KR); Friedrich-Karl Bruder, Krefeld (DE); Thomas Peter Fäcke, Leverkusen (DE); Rainer Hagen, Leverkusen (DE); Günther Walze, Köln (DE)

(73) Assignees: LG DISPLAY CO., LTD., Seoul (KR); COVESTRO DEUTSCHLAND AG, Leverkusen (DE)

( * ) Notice: Subject to any disclaimer, the term of this patent is extended or adjusted under 35 U.S.C. 154(b) by 220 days.

(21) Appl. No.: 14/727,362

(22) Filed: Jun. 1, 2015

(65) Prior Publication Data

US 2016/0091648 A1     Mar. 31, 2016

(30) Foreign Application Priority Data

Sep. 30, 2014    (KR) .......................... 10-2014-0132075

(51) Int. Cl.
*G02B 6/00*      (2006.01)
*G02F 1/13*      (2006.01)
(Continued)

(52) U.S. Cl.
CPC .......... *G02B 6/005* (2013.01); *G02B 6/0023* (2013.01); *G02B 6/0035* (2013.01);
(Continued)

(58) Field of Classification Search
CPC .... G02B 6/005; G02B 6/0023; G02B 6/0035; G02B 6/0038; G02B 6/0051;
(Continued)

(56) References Cited

U.S. PATENT DOCUMENTS 4,714,983 A * 12/1987 Lang .................... G02B 6/0021
349/65
7,440,153 B2   10/2008 Lee et al.
(Continued)

FOREIGN PATENT DOCUMENTS

CN          102799021 A     11/2012
KR    10-2014-0077813 A     6/2014
(Continued)

*Primary Examiner* — Andrew Coughlin
*Assistant Examiner* — Nathaniel Lee
(74) *Attorney, Agent, or Firm* — Birch, Stewart, Kolasch & Birch, LLP

(57) ABSTRACT

The present disclosure relates to a thin film type controlled viewing window back light unit and a thin flat type Controlled Viewing window Display using the same. The present disclosure suggests a thin film type back light unit which can include: a base film having a width and a length, and including a high refractive film and a low refractive film stacked on the high refractive film; an incident pattern disposed at one side of a bottom surface of the base film; a reflective pattern disposed at an opposite side apart from the one side with the length of the bottom surface of the base film, and covering the width of the opposite side; a light radiating pattern disposed on an upper surface of the base film; a holographic film for controlling a viewing-window disposed on the light radiating pattern; and a light source being apart from the incident pattern, and providing an incident light to the incident pattern.

16 Claims, 15 Drawing Sheets

(51) Int. Cl.
  *F21V 8/00* (2006.01)
  *G02B 27/22* (2018.01)
  *G02F 1/1335* (2006.01)
  *G02B 5/32* (2006.01)

(52) U.S. Cl.
  CPC ......... *G02B 6/0038* (2013.01); *G02B 6/0051* (2013.01); *G02B 6/0055* (2013.01); *G02B 6/0066* (2013.01); *G02B 6/0076* (2013.01); *G02B 27/225* (2013.01); *G02F 1/1323* (2013.01); *G02F 1/1336* (2013.01); *G02B 5/32* (2013.01)

(58) Field of Classification Search
  CPC .. G02B 6/0055; G02B 6/0066; G02B 6/0076; G02B 27/225; G02F 1/1323; G02F 1/1336
  See application file for complete search history.

(56) References Cited

U.S. PATENT DOCUMENTS

| | | | |
|---|---|---|---|
| 8,915,635 B2 * | 12/2014 | Fiorentino | G02B 6/002 362/609 |
| 2004/0062502 A1 * | 4/2004 | Levola | G02B 5/1866 385/129 |
| 2005/0002611 A1 | 1/2005 | Levola | |
| 2013/0242606 A1 | 9/2013 | Kurashige et al. | |
| 2013/0308339 A1 | 11/2013 | Woodgate et al. | |

FOREIGN PATENT DOCUMENTS

| WO | WO 2004/015489 A1 | 2/2004 |
|---|---|---|
| WO | WO 2010/124028 A2 | 10/2010 |
| WO | WO 2012/070652 A1 | 5/2012 |

* cited by examiner

THIN FILM TYPE CONTROLLED VIEWING WINDOW BACK LIGHT UNIT AND THIN FLAT TYPE CONTROLLED VIEWING WINDOW DISPLAY USING THE SAME

CROSS REFERENCE TO RELATED APPLICATIONS

This application claims the priority benefit of Patent Application No. 10-2014-0132075 filed on Sep. 30, 2014 in Republic of Korea, which is incorporated herein by reference for all purposes as if fully set forth herein.

BACKGROUND OF THE INVENTION

Field of the Invention

The present disclosure relates to a thin film type controlled viewing window back light unit and a thin flat type Controlled Viewing window Display (or 'CVD') using the same. Especially, the present disclosure relates to a thin film type controlled viewing window back light unit adopting the holography technology and a thin flat type controlled viewing window display using the same.

Discussion of the Related Art

Recently, many technologies and researches for making and reproducing the 3D (Three Dimensional) image/video are actively developed. As the media relating to the 3D image/video is a new concept media for virtual reality, it can improve the visual information better, and it will lead the next generation display devices. The conventional 2D image system merely suggests the image and video data projected to a plan view, but the 3D image system can provide the full real image data to the viewer. So, the 3D image/video technologies are the True North image/video technologies.

Typically there are three methods for reproducing 3D image/video: the stereoscopy method, the holography method and the integral imaging method. Among them, the holography method uses laser beams so that it is possible to observe the 3D image/video with naked eyes. The holography method is the most ideal method because it has an excellent visual stereoscopic property without any fatigue of observer.

To produce a recording of the phase of the light wave at each point in an image, holography uses a reference beam which is combined with the light from the scene or object (the object beam). If these two beams are coherent, optical interference between the reference beam and the object beam, due to the superposition of the light waves, produces a series of intensity fringes that can be recorded on standard photographic film. These fringes form a type of diffraction grating on the film, which is called the hologram. The central goal of holography is that when the recorded grating is later illuminated by a substitute reference beam, the original object beam is reconstructed (or reproduced), producing a 3D image/video.

When a display system is implemented using a holography technology according to the related art, it is very hard to get evenly distributed brightness because the intensity of the light radiated from the light source follows the Gaussian Profile. In addition, when the incident light form the light source has the inclined incident angle in order to reduce the high order diffraction components causing the image noise, the collimation degree of the laser may be lowered.

In order to solve or address the drawbacks of the related art, there are some researches for providing the back light unit BLU which can maintain the collimation degrees of the incident light even though the incident light has the inclined angle for reducing the high order diffraction components. For example, the system using the collimation lens was presented. FIG. 1A is a figure illustrating a schematic structure of the back light unit BLU suggesting a collimated light beam using the collimation lens, according to a related art.

Referring to FIG. 1A, disposing a point light source 30 at the position of the light source and positioning a collimation lens CL at the focal length position apart from the light source 30, the lights radiated from the point light source 30 may be formed as the collimated beam light by the collimation lens CL. This collimated light beam can be used as a reference light beam in the non-glasses type display system.

However, in the most cases of the holographic display system, it is preferred that the reference light beam is incident into the diffraction optical element with an inclined angle from the vertical direction to the incident surface of the element. The reason is that, as the diffraction element like the holographic film may generate the 0th mode image and/or 1st mode image and they may work as noises in the holographic image, the 0th mode and/or 1st mode should be reduced or eliminated. To do so, it is easy way for reducing or eliminating these noises to make an incident angle to the incident reference light beam.

For example, the position of the point light source 30 may be shifted at any one side to make the incident angle in the back light unit shown in FIG. 1A. FIG. 1B is a figure illustrating a schematic structure of the back light unit BLU generating a collimated light beam using the collimation lens in which the collimated light beam has an incident angle, according to the related art.

Referring to FIG. 1B, the point light source 30 may be shifted or moved to upside from the light axis 130 so that the incident angle from the light axis forwarding to the center of the lens CL may be α. Then, theoretically, as the dotted line in FIG. 1B, the collimated light beam has the incident angle α from the light axis 130. However, in actual case, by the physical characteristics such as the spherical aberration, the real light path may not be collimated and/or paralleled with the incident angle α, as the solid line in FIG. 1B. As a result, the light beam from the back light unit BLU may not be incident into the wanted area and/or wanted direction evenly but be unevenly distributed over the incident surface of the diffraction element.

As one method for solving this problem, by combining the prism sheet with the collimation lens, the back light unit of which the light direction can be controlled is suggested. Hereinafter, referring to FIG. 2, we will briefly explain about the light direction controllable back light unit. FIG. 2 is a figure illustrating a schematic structure of the back light unit suggesting a collimated light beam which direction can be controllable according to the related art.

The light direction controllable back light unit BLU according to the related art comprises a collimated lens CL, a point light source 30 disposed one side of the collimation lens CL and a prism sheet PS disposed at the other side of the collimated lens CL. The point light source 30 may be any type of light source which can radiate lights to radial directions from one point. In order to radiate most of all lights from the point light source 30 to the collimation lens CL, a mirror (not shown) may be further included at the back side of the point light source 30.

The point light source 30 can be preferably disposed at the focal plane of the collimation lens CL. Especially, the point light source 30 can be more preferably positioned on the light axis 130 connecting between the center point of the collimation lens CL and the center point of the forcal plane of the collimation lens CL.

The collimation lens CL may change the lights radiated from the point light source 30 into a collimated light beam 100. That is, the collimated light beam 100 may radiate to one direction parallel to the light axis 130. The collimation lens CL may include any one of the optical lenses such as the fresenl lens.

It is preferred that the prism sheet PS is positioned as being opposite the point light source 30 across the collimation lens CL. The prism sheet PS may refract the light direction with certain angle α as being inclined to the light axis 130. By the prism sheet PS, the parallel property of the collimated light beam 100 may be maintained and the propagation direction of the collimated light may be redirected to downward with angle of a from the light axis 130. As a result, the prism sheet PS can change the collimated light beam 100 into the controlled collimated light beam 200. The prism sheet PS may include a Fresnel prism sheet.

The holographic display system using these back light units can be applied to the hologram 3D display or the controlled viewing-window display and so on. Particularly, the controlled viewing-window display can be applied to the various display systems.

For one example, as the viewing window can be controlled, it can be applied to the security display system in which the display information is presented to the specific persons only. For another example, it can be applied to the multi-viewing display system in which different video data can be provided to different positions (or 'viewing areas'). Further, as the left eye image and the right eye image can be provided to the left eye and the right eye, respectively without any interference, a good 3D display can be designed.

FIG. 3 is a figure illustrating the schematic structure of the controlled viewing-window display according to the related art. Referring to FIG. 3, the controlled viewing-window display according to the related art comprises a display panel LCP representing video data and a back light unit BLU. The display panel LCP may be a flat panel display using a back light system, such as the liquid crystal display panel. The controlled viewing-window display suggests the display information represented on the display panel LCP into the certain area (or 'the specific viewing window'). In order to control the viewing window, the back light unit BLU in which the radiating area of the back light can be controlled is required. For example, the back light unit BLU may be a system adopting light control system as shown in FIG. 2.

In detail example, the back light unit BLU for the controlled viewing-window display according to the related art may include a light source LED, a lens LEN, a reflection plate REF and a holographic film HOE. In order for applying the holographic technology, it is preferable to use the highly collimated light beam. Therefore, it is preferable that the light source LED may be a laser or a light emitting diode laser. For the case that the light source LED is the general light emitting diode, a collimation lens LEN may further included in order to get the collimated light beam. The holographic film HOE is for making the back light radiating to a specific viewing area using the collimated light. By radiating the back light as a reference light beam to the holographic film HOE, the back light of which radiating area can be controlled according to the recording pattern of the holographic film HOE may be provided to the display panel LCP.

In order to develop the large area controlled viewing-window display, a large area holographic film HOE corresponding to the large area of the display panel LDP should be disposed at the back side of the large area display panel LDP. Further, a reflection plate REF may be included to send the back light radiated from the light source LED and collimated by the collimation lens LEN to the large area holographic film HOE.

As mentioned above, the controlled viewing-window display should include the lens LEN and the reflection plate REF for optically converging and diversing the light. Therefore, in order to provide the highly collimated light, there should be a physical space for ensuring enough light paths. That is, the back light unit BLU should require a large volume space. However, as the controlled viewing-window display according to the related art would have volumatic space and heavy weight, it is hard to apply the backlight unit of the related art to various display systems.

SUMMARY OF THE INVENTION

In order to overcome or address the above mentioned drawbacks, one purpose of the present disclosure is to suggest an ultra thin film type controlled viewing-window back light unit providing a collimation light. Another purpose of the present disclosure is to suggest an thin film type controlled viewing-window display having an ultra thin film type controlled viewing-window back light unit.

In order to accomplish the above purpose, the present disclosure suggests a thin film type back light unit comprising: a base film having a width and a length, and including a high refractive film and a low refractive film stacked on the high refractive film; an incident pattern disposed at one side of a bottom surface of the base film; a reflective pattern disposed at an opposite side apart from the one side with the length of the bottom surface of the base film; a light radiating pattern disposed on an upper surface of the base film; a holographic film for controlling a viewing-window disposed on the light radiating pattern; and a light source being apart from the incident pattern with a first focal length, and providing an incident light to the incident pattern.

In one embodiment, the back light unit further comprises a reflection layer covering the bottom surface of the base film except for the incident pattern and the reflective pattern.

In one embodiment, the incident pattern includes a holography pattern configured to convert the incident light into an expanded light, the incident light perpendicularly enters onto a surface of the incident pattern, and the expanded light has a refraction angle larger than a critical angle for total reflection at an interface between the high refractive film and the low refractive film, and is expanded corresponding to the width.

In one embodiment, the expanded light propagates to the reflective pattern through into the high refractive film.

In one embodiment, the reflective pattern includes a holography pattern configured to convert the expanded light into a collimated light which has a reflection angle smaller than the refraction angle and larger than a critical angle of total reflection at an interface between the low refraction film and an air, and covers the width.

In one embodiment, some portions of the collimated light are diffracted by the light radiating pattern, preferably by a holographic pattern, and are radiated outward from the low refractive film into free space.

In one embodiment, the light source is configured to be tilted for selecting one incident angle among some inclined angles to the incident light perpendicularly entering onto the surface of the incident pattern.

In one embodiment, the light source includes n light sources, in which each of the light sources providing the incident light perpendicularly entering onto the surface of the incident pattern, respectively, and the incident pattern includes n incident patterns, in which each of the incident patterns has an incident point corresponding to the each light sources, respectively, and in which each of the incident patterns refracts each incident light perpendicularly entering onto the surface of the incident pattern to a deflected angle.

In one embodiment, the back light unit further comprises: a light absorbing pattern disposed over the light radiating pattern at the side where the incident pattern is located, wherein a length of the light absorbing pattern is adapted to the length of the incident pattern, an inner end side of the light absorbing pattern is positioned where the refraction angle of the incident light equals to the total reflection angle at the interface between the high refractive film HR and the low refractive film LR, and an outer end side of the light absorbing pattern is positioned between an inner end side of the incident pattern and an outer end of the high refractive film.

Further, the present disclosure suggests a controlled viewing-window display comprising: a flat display panel; and a back light unit including: a light source disposed at rear side of the flat display panel; a light guide film disposed between the light source and the flat display panel as facing to the flat display panel, and converting a incident light entering into an incident point from the light source into a back light covering the whole surface of the flat display panel; and a holographic film controlling the optical property of the back light from the light guide film.

In one embodiment, the light guide film includes: a base film having a width and a length, and including a high refractive film and a low refractive film stacked on the high refractive film; an incident pattern disposed at one side of a bottom surface of the base film; a reflective pattern disposed at an opposite side apart from the one side with the length of the bottom surface of the base film, and covering the width of the opposite side; and a light radiating pattern disposed on an upper surface of the base film, and the light source provides an incident light to the incident pattern.

In one embodiment, the incident pattern includes a holography pattern configured to convert the incident light into an expanded light, the incident light perpendicularly enters onto a surface of the incident pattern, and the expanded light has a refraction angle larger than a critical angle for total reflection at an interface between the high refractive film and the low refractive film, and is expanded corresponding to the width.

In one embodiment, the reflective pattern includes a holography pattern configured to convert the expanded light into a collimated light which has a reflection angle smaller than the refraction angle and larger than a critical angle of total reflection at an interface between the low refraction film and an air, and covers the width.

In one embodiment, some portions of the collimated light are diffracted by the light radiating pattern, preferably by a holographic pattern, and are radiated outward from the low refractive film into free space.

In one embodiment, the light source is configured to be tilted for selecting one incident angle among some inclined angles to the incident light perpendicularly entering onto the surface of the incident pattern.

In one embodiment, the light source includes n light sources, in which each of the light sources providing the incident light perpendicularly entering onto the surface of the incident pattern, respectively, and the incident pattern includes n incident patterns, in which each of the incident patterns has an incident point corresponding to the each light sources, respectively, and in which each of the incident patterns refracts each incident light perpendicularly entering onto the surface of the incident pattern to a deflected angle.

In one embodiment, the controlled viewing-window display further comprises: a light absorbing pattern disposed over the light radiating pattern at the side where the incident pattern is located, wherein a length of the light absorbing pattern is adapted to the length of the incident pattern, an inner end side of the light absorbing pattern is positioned where the refraction angle of the incident light equals to the total reflection angle at the interface between the high refractive film HR and the low refractive film LR, and an outer end side of the light absorbing pattern is positioned between an inner end side of the incident pattern and an outer end of the high refractive film.

In one embodiment, the controlled viewing-window display further comprises: a selective diffusion sheet disposed at one of between the holographic film and the flat display panel and between the holographic film and the light guide film.

In one embodiment, the controlled viewing-window display further comprises: a light guide panel disposed under the light guide film; and an edge type light source disposed at one side of the light guide panel.

The present disclosure suggests an ultra thin film type back light unit adopting a holography technology which can be easily applied to a non-self luminance flat panel display such as liquid crystal display. Therefore, it is possible to suggest a thin film type holographic display having highly collimated back light. Especially, the present disclosure suggests an ultra thin film type back light unit applying to the various type holographic displays such as the controlled viewing-window display. The controlled viewing-window display can be applied to various displays including the non-glasses type display, the multi view display, or the security display. The present disclosure suggests a thin film type back light unit for the liquid crystal display which makes the display much thinner, much lower power consumption and much higher light efficiency.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1A:
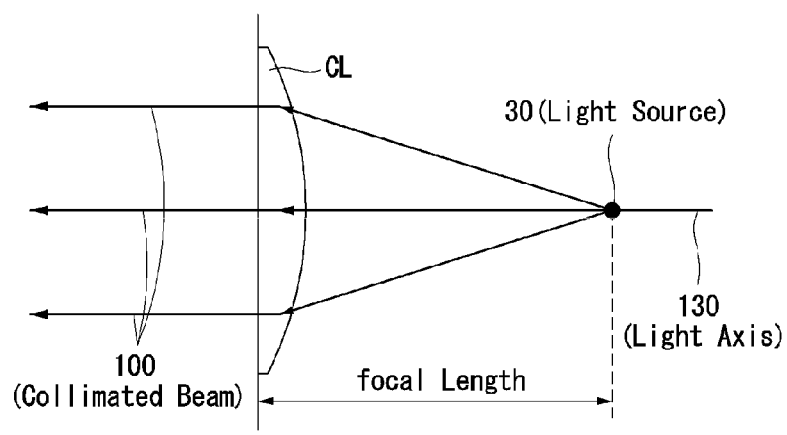
FIG. 1A is a figure illustrating a schematic structure of the back light unit BLU suggesting a collimated light beam using the collimation lens, according to a related art.
Figure 1B:
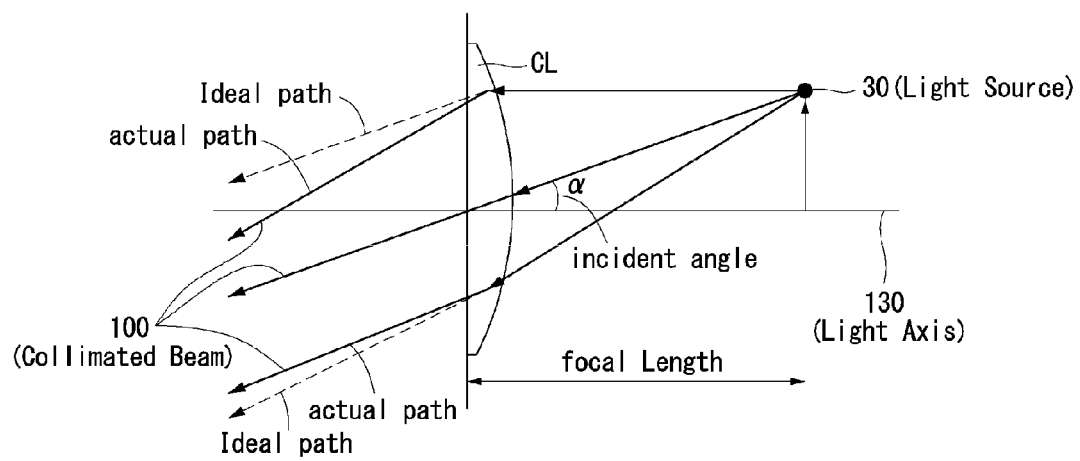
FIG. 1B is a figure illustrating a schematic structure of the back light unit BLU generating a collimated light beam using the collimation lens in which the collimated light beam has an incident angle, according to the related art.
Figure 2:
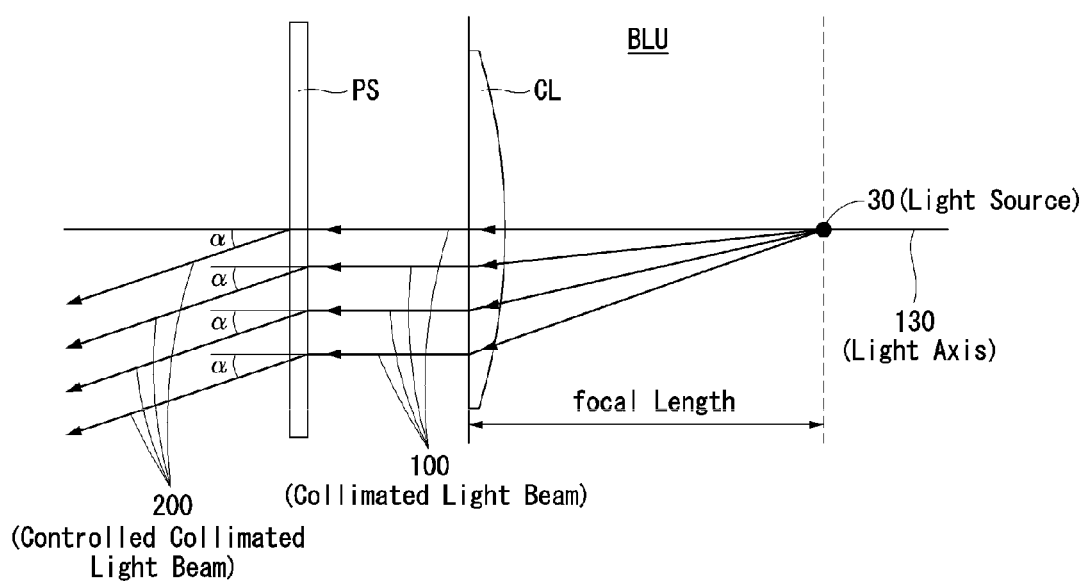
FIG. 2 is a figure illustrating a schematic structure of the back light unit suggesting a collimated light beam which direction can be controllable according to the related art.
Figure 3:
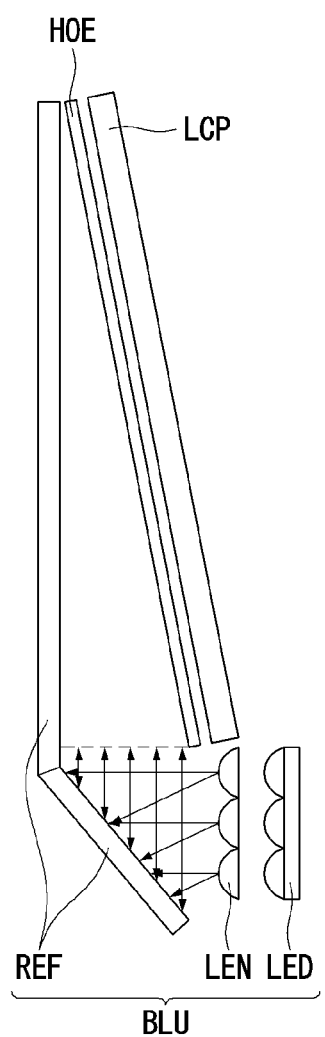
FIG. 3 is a figure illustrating the schematic structure of the controlled viewing-window display according to the related art.

Referring to attached figures, we will explain preferred embodiments of the present invention. Like reference numerals designate like elements throughout the detailed description. However, the present disclosure is not restricted by these embodiments but can be applied to various changes or modifications without changing the technical spirit. In the following embodiments, the names of the elements are selected by considering the easiness for explanation so that they may be different from actual names.

Figure 4:
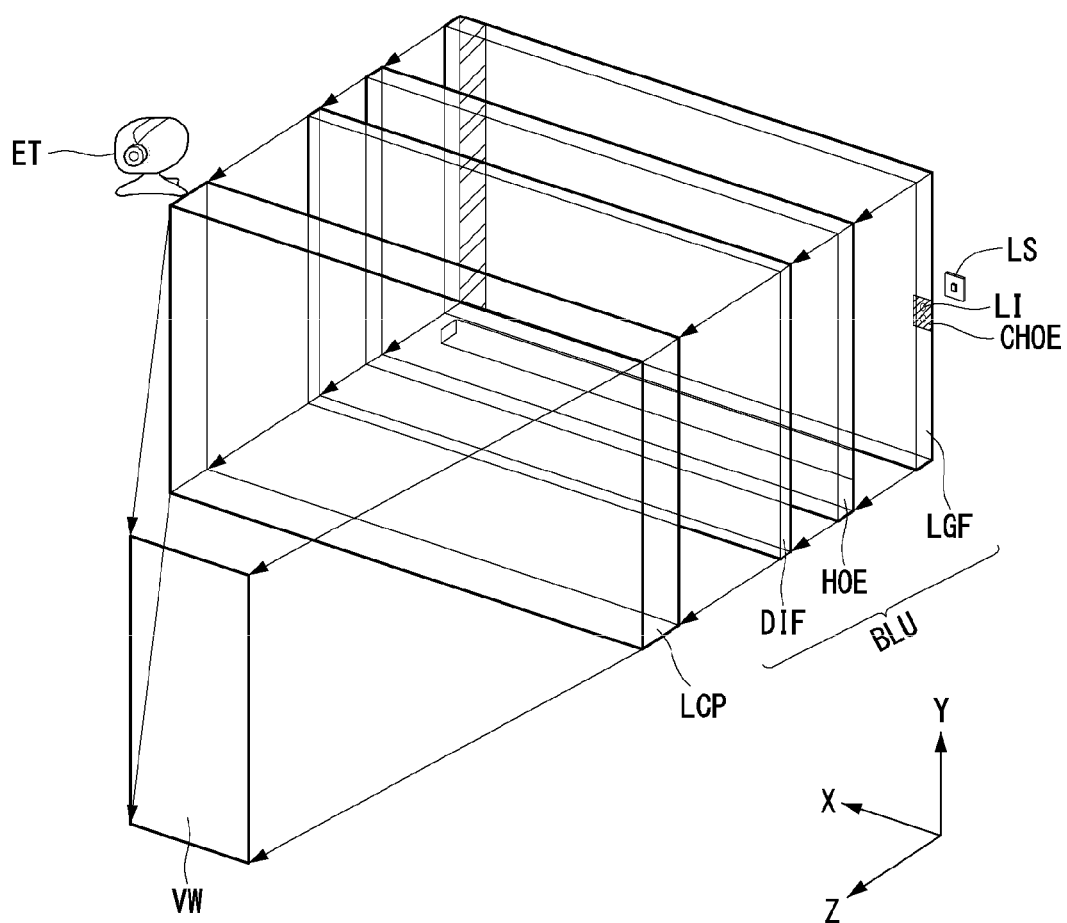
FIG. 4 is a perspective view illustrating a schematic structure of a controlled viewing-window display according to an embodiment of the present invention.

Hereinafter, referring to FIG. 4, we will explain about a controlled viewing-window display according to the first embodiment of the present disclosure. FIG. 4 is a perspective view illustrating a schematic structure of a controlled viewing-window display according to the present disclosure.

Referring to FIG. 4, a controlled viewing-window display according to the embodiment of the present disclosure comprises a display panel LCP and a back light unit BLU disposed at rear side of the display panel LCP. The display panel LDP may be a liquid crystal display panel using the black light unit BLU. FIG. 4, as a perspective view, illustrates most elements as having the thick thickness for easily representing the structure. However, in actual, the back light unit BLU can be made of ultra thin film type elements. All components of the controlled viewing-window display in this and other embodiments are operatively coupled and configured.

The back light unit BLU includes an ultra thin light guide film LGF. It is preferred that the upper (or front) large surface of the ultra thin light guide film LGF is facing with the back side of the flat display panel LCP. At both sides which are facing each other on the lower (or back) surface of the ultra thin light guide film LGF, one holography pattern is disposed, respectively. As the thickness of the light guide film LGF is very thin, in that case, it is preferable that the light source LS is disposed at the back side surface of the light guide film LGF.

The light guide film LGF may change the lights radiated from the point light source LS such as laser or light emitting diode into a surface light source having a radiating surface corresponding to the surface of the light guide film LGF and supplies to the display panel LCP. For detailed structure, it will be mentioned later when we will explain about the back light unit BLU.

At the front side of the light guide film LGF, a holographic film HOE for receiving a radiating area of the back light is disposed. At the holographic film HOE has a diffraction pattern which converts the back light radiated into the holographic film HOE to a predetermined area, the viewing window VW. The recording of the diffraction pattern is well known so we will not explain about that.

When the controlled viewing-window display may be applied to a display in which the general mode and the controlled viewing-window mode can be selected, a selective diffusion sheet DIF switching between the transparent mode and the scattering mode may be further disposed. When selecting the transparent mode of the selective diffraction sheet DIF, all lights from the holographic film HOE may penetrate the selective diffraction sheet DIF. As a result, the back lights from the holographic film HOE converses to the predetermined viewing window area defined by the holographic film HOE. In the interim, when selecting the scattering mode of the selective diffusion sheet DIF, the back lights collimated by the holographic film HOE may be scattered so that the collimated property may be lost. As a result, the back light can be the back light as being used in the general liquid crystal display.

In convenience, FIG. 4 illustrates as the selective diffusion sheet DIF is positioned between the holographic film HOE and the display panel LCP. However, in some cases, the selective diffusion sheet DIF may be positioned between the holographic film HOE and the thin film type wave guide SWG. The position of the selective diffusion sheet DIF may be selected as the back light maintains the collimated property or loose the collimated property by user selection.

Further, it is preferable that the control viewing-window display according to the present disclosure includes an eye tracker ET. The eye tracker ET is for tracing the position of the observer (especially, the eyes of the observer) so it provides the current position of the observer to the back light unit which can control the radiation direction of the back light. When the position of the observer is changed, the eye tracker ET can detect the new position of the observer and provide it to the back light unit. Then the back light unit may control the radiation direction of the back light so as the back light can be provided to correct position of the observer's eyes. For detail explanation how to control the radiation direction of the back light will be mentioned when we explain about the back light unit BLU.

Hereinafter, we will explain how the controlled viewing window display works. The display panel LCP would represent various video images and/or information. The back light unit BLU would provide the back lights of which radiating area is controlled within certain viewing window VW area. Then, the video images and/or information represented by the display panel LCP would be provided within the controlled viewing window VW area only according to the back light suggested by the back light unit BLU.

For one example, the controlled viewing-window display may be applied to a 3D display system. At the first frame, the display panel LCP may represent one left eye image. At that time, the back light unit BLU may provide the back light of which viewing-window is controlled as having the viewing window size corresponding to the size of one eye of human. Further, the eye tracker ET may detect the current position of the observer. Using the information of the observer's current position, the back light unit BLU may control the projection direction of the viewing window VW as to be focused to the left eye of the observer. Then, the left eye image can be suggested only to the left eye of the observer.

At the next (second) frame, the display panel LCP may represent one right eye image. At that time, the back light unit BLU may provide the back light of which the viewing-window VW is controlled as having the size corresponding to the size of one eye of human. Further, the eye tracker ET may detect the current position of the observer. Using the information of the observer's current position, the back light unit BLU may control the projection direction of the viewing window VW as to be focused to the right eye of the observer. Then, the right eye image can be suggested only to the right eye of the observer. Designing as to work like this, the controlled viewing-window display can be applied to the 3D image display without the shutter glasses or the polarization glasses currently used for implementing the 3D display system.

When the controlled viewing-window display is used for the 3D mode, it is preferable that the selective diffusion sheet DIF is selected to the transparent mode. However, when the selective diffusion sheet DIF is switched to the scattering mode, the viewing window VW of the video images and/or information is not controlled so that they can be radiated in all directions in front of the display panel LCP. That is, the display panel LCP may suggest the 2D video images and/or information. As mentioned above, the selective diffusion sheet DIF may be positioned at front side or at back side of the holographic film HOE in accordance with the designer's intention. In some cases that the display system is used for the 3D display system only, the selective diffusion sheet DIF may not be included.

For another example, the controlled viewing-window display may be applied to a multi-view display system. At the first frame, the display panel LCP may represent the first kind of video images and/or information. At the same time, the back light unit BLU may provide the back light of which the viewing-window VW is controlled as having the size corresponding to the size of the face of human. Further, the eye tracker ET may detect the current position of the observer who sits on the left side of the display panel LCP. Then, the back light unit BLU may control the projection direction of the viewing window VW as to be focused to the observer sitting on the left side from the display panel LCP. Then, the first kind of images and/or information can be suggested only to the left observer.

At the next frame, the display panel LCP may represent the second kind of video images and/or information. At the same time, the back light unit BLU may provide the back light of which the viewing-window VW is controlled as having the size corresponding to the size of the face of human. Further, the eye tracker ET may detect the current position of the observer who sits on the right side of the display panel LCP. Then, the back light unit BLU may control the projection direction of the viewing window VW as to be focused to the observer sitting on the right side from the display panel LCP. The right side observer may be apart from the left side observer with the width of one person's chest at least. Then, the first kind of images and/or information can be suggested only to the right observer.

When the multi-view display system using the controlled viewing-window display is activated in the multi-viewing mode, it is preferable that the selective diffusion sheet DIF is on the transparent mode. So that, the first kind of video images can be suggested to the first person only and the second kind of the video images can be suggested to the second person only. In the interim, when the selective diffusion sheet DIF is selected on the scattering mode, the video images are suggested without the controlled viewing-window, so that the display should be used in normal mode in which the video images are provided all persons commonly. As mentioned above, the selective diffusion sheet DIF may be positioned at front side or at back side of the holographic film HOE in accordance with the designer's intention. In some cases that the display system is used for multi-view display system only, the selective diffusion sheet DIF may not be included.

Figure 5:
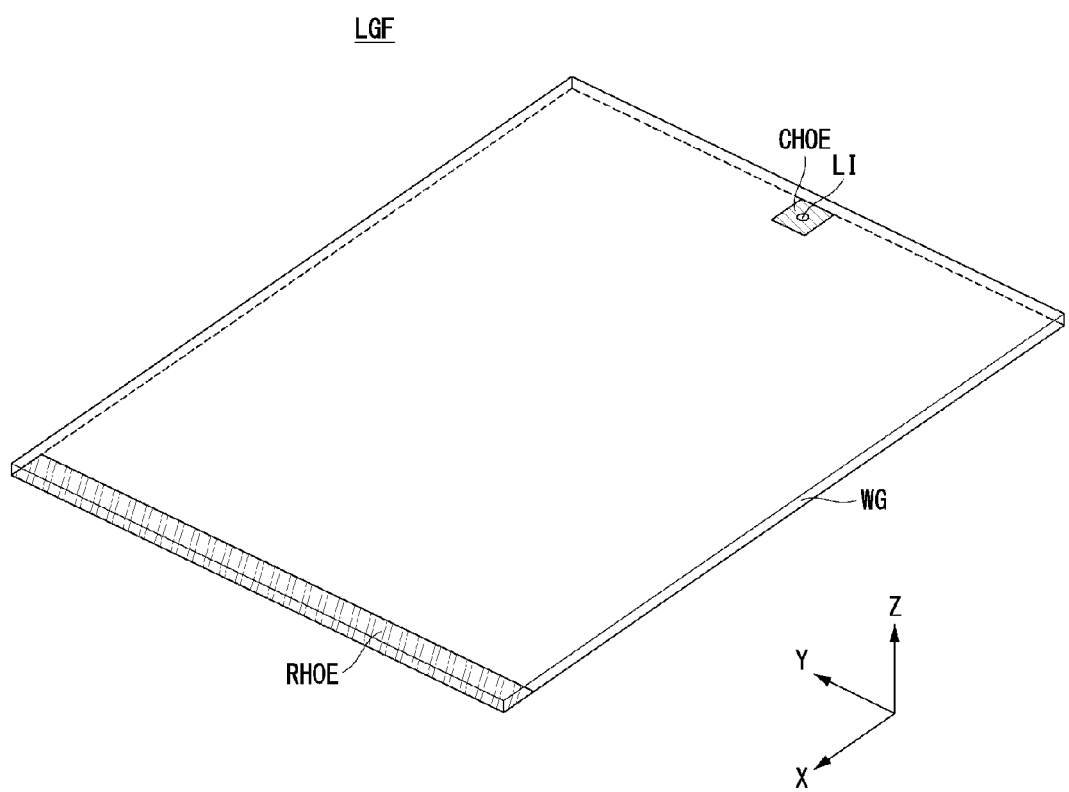
FIG. 5 is a perspective view illustrating a structure of an ultra thin light guide film according to one embodiment of the present invention.
Figure 6:
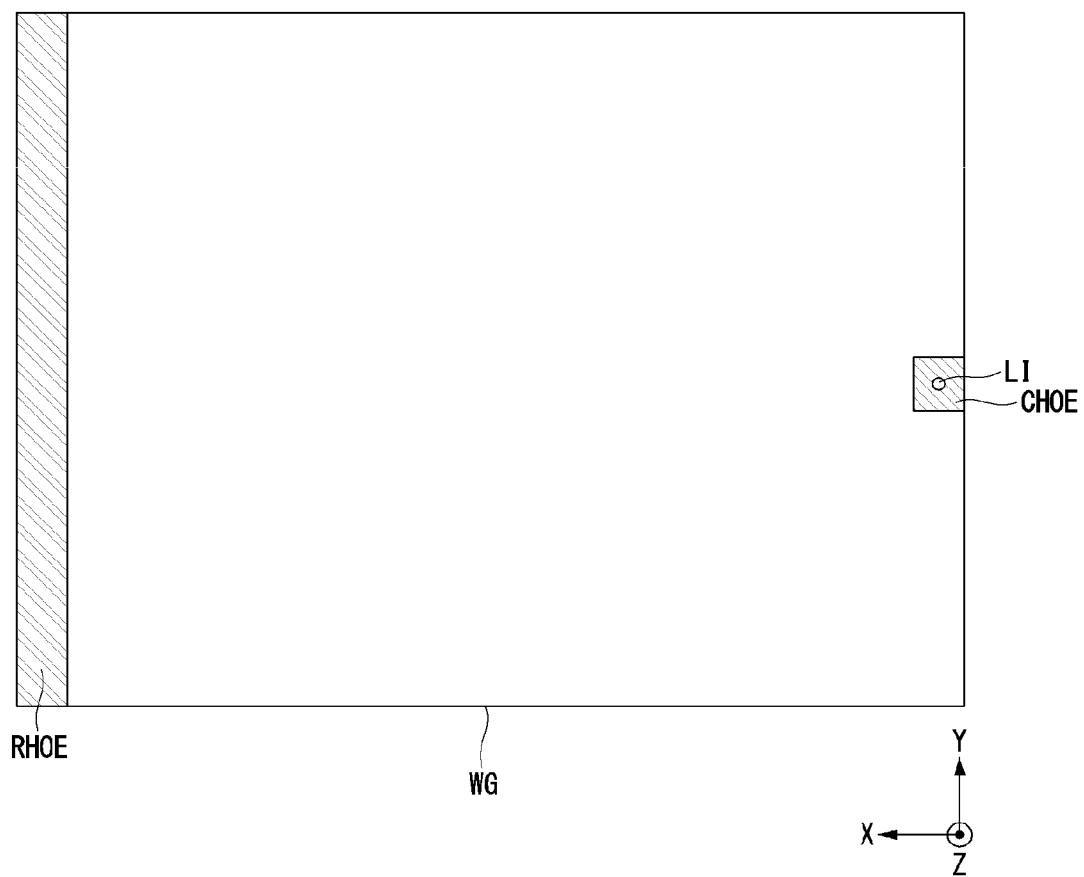
FIG. 6 is a plane view illustrating the structure of the ultra thin light guide film, shown in FIG. 5 according to one embodiment of the present invention.
Figure 7:
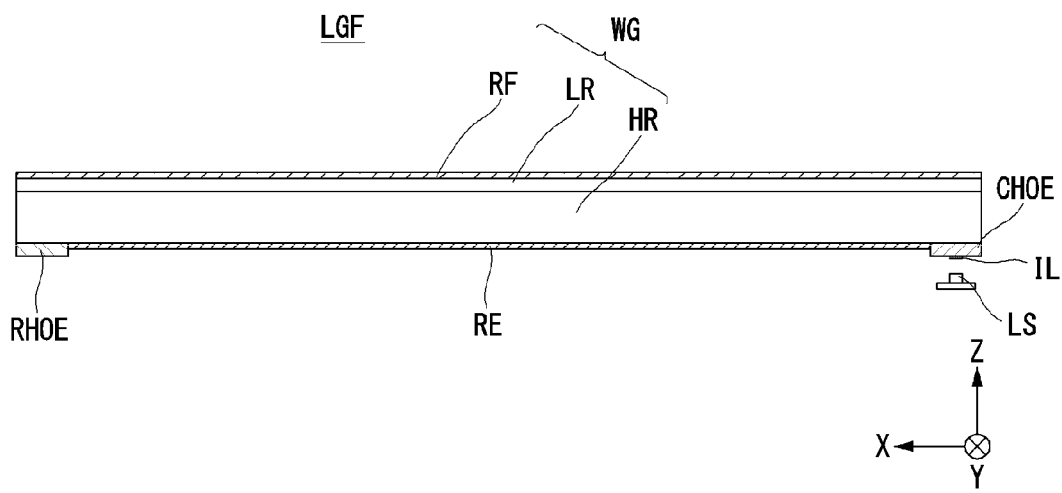
FIG. 7 is an enlarged side view illustrating the structure of an ultra thin light guide film, shown in FIG. 5 according to one embodiment of the present invention.

Referring to FIGS. 5 to 11, the structure of the ultra thin light guide film LGF according to the present disclosure. Especially, the explanation would be focused on the structure of the ultra thin light guide film LGF and the relationship with the light source LS, will be explained. At first, referring to FIGS. 5 to 7, the structure of the ultra thin light guide film LGF will be explained. FIG. 5 is a perspective view illustrating a structure of an ultra thin light guide film according to one embodiment of the present disclosure, will be explained. FIG. 6 is a plane view illustrating the structure of the ultra thin light guide film, shown in FIG. 5 according to one embodiment of the present disclosure. FIG. 7 is an enlarged side view illustrating the structure of an ultra thin light guide film, shown in FIG. 5 according to one embodiment of the present disclosure.

Referring to FIGS. 5 to 7, the ultra thin light guide film LGF according to one embodiment of the present disclosure includes a base film WG for guiding the back light, wherein the base film WG is a thin film type light guide media or a wave guide media. The base film WG may include a high refractive film HR and a low refractive film LR which are joined in surface and/or stacked each other. Especially, the low refractive film LR is stacked on the high refractive film HR. Here, 'on', 'upper', 'front' or 'upside' means the direction at which the back light is finally radiated from the ultra thin light guide film LGF, that is, the direction of the light forwarding the flat display panel LCP.

Further, on the upper surface of the low refractive film LR, a light radiating pattern RF may be included. For example, a light diffractive film may be attached or a light diffractive layer may be deposited on the upper surface of the low refractive film LR. Otherwise, a grating pattern may be laminated on the upper surface of the low refractive film LR or formed at the upper surface of the low refractive film LR directly.

In addition, on the rear surface of the high refractive film HR, a reflection layer RE may be deposited covering most of all surfaces except for areas where the incident pattern CHOE and the reflective pattern RHOE. The reflection layer RE reflects the light which is total-reflected at the interface between the high refractive film HR and the low refractive film LR and goes out from the rear surface of the high refractive film HR, so that the light is return into the high refractive film HR. The rear surface of the high refractive film HR is the interface with the air, so that most light may be total-reflected. To eliminate the light leakage, the reflection layer RE may be disposed at the rear surface of the high refractive film HR. However, in some cases that the light guide film LGF would be kept in transparent property, the reflection layer RE is not the essential element, but an optional element.

The base film WG is preferably a rectangular shape having the surface area corresponding to the shape and size of the display panel LCP. At one side of the base film WG, an incident pattern CHOE is disposed for receiving the light from the light source LS. At another side opposite the one side of the base film, a reflective pattern RHOE is disposed. The incident pattern CHOE, as for receiving the light, is preferable facing with the light source LS directly. Preferably, the incident pattern CHOE and the reflective pattern RHOE may be disposed on the rear surface of the base film WG. In other words, they are preferably attached at one side and opposite side, on the rear surface of the high refractive film HR.

The light source LS may be a point light source like a laser or a tiny surface light source like a light emitting diode (LED) or a light emitting diode laser. In the related art, an LED array is used, in which a plurality of LEDs are arrayed in a line. In this case, due to the number of LED, there are heating problem and the energy efficiency is low.

In the present disclosure, using at least number of light source, the heating problem can be solved and the high energy efficiency can be ensured. For example, in one embodiment of the present disclosure, the thin film type back light unit may include just one white light LED for the light source LS. Otherwise, a red light LED, a green light LED and a blue light LED are arrayed in vertical direction, in horizontal direction or in a triangular direction to form the light source LS so that the light source LS can suggest a white light. For the case of high luminescent thin film type back light unit, or for the case of a plurality light sources for various purpose, a plurality of white light LED may be used. For still other case, a plurality of one LED set may be used, wherein one LED set may include a red light LED, a green light LED and a blue light LED. For convenience, in one preferred embodiment, we will explain with the case of one white light LED is used.

The light source LS may be disposed as facing with the incident pattern CHOE attached at one side of the rear surface of the base film WG. In figures, the light source LS is disposed as being apart from the incident pattern CHOE with a predetermined distance. However, according to the intend of the designer, the light source LS may be very closely disposed to the incident pattern CHOE. The light radiated from the light source LS would enter into the incident pattern CHOE via the incident point LI. Especially, the light may enter perpendicularly to the bottom surface of the high refractive film HR (along to the 'Z' axis).

In the present disclosure, it is preferable that the number of the light source LS would be minimized. The incident pattern CHOE may be disposed as covering whole width of the one side of the base film WG. It is preferable that the incident pattern CHOE has optimized or minimized width. For the portable displays, one light source LS may be enough. However, for the large area displays such as 30 inch or more TV set, a plurality of light source LS may be required for better efficiency. The incident pattern CHOE works for expanding the light from the point light source as to be corresponding to the width of the reflective pattern RHOE. Therefore, considering the efficiency of the light expansion, it is preferable to select the number of light source LS and to control the size of the incident pattern CHOE.

The incident pattern CHOE receives the light from the light source LS disposed at one side of the base film WS, and sends it to the reflective pattern RHOE disposed at the opposite side of the base film WS. The light guide film LGF preferably radiates the back light with an evenly distributed over the whole surface. Therefore, the incident pattern CHOE expands and/or diffuses the light from the light source LS into the expanded light covering to the width of the base film WG. Therefore, it is preferable that the incident pattern CHOE may be a holography pattern in which the light from the light source LS to the light incident point LI is expanded or diffused to the width corresponding to the opposite side.

The light into the incident pattern CHOE is radiated to the opposite side of the base film WG as an expanded light. Especially, the expanded light has a light path of incident angle at which the light is total reflected at the interface between the high refractive film HR and the low refractive film LR. It is preferable that the incident pattern CHOE preferably may be a holography pattern by which the light from the light source LS is expanded to the width of opposite side of the base film WG and has an incident angle of total reflection in the high refractive film HR.

The light from the incident pattern CHOE, by the repeated total reflection through the base film WG, goes to the reflective pattern RHOE disposed at the opposite side of the base film WG. The light into the reflective pattern RHOE would be converted into a collimated light distributed over the whole surface of the ultra thin light guide film LGF. Therefore, the reflective pattern RHOE is preferable a holography pattern in which the expanded light is converted into the collimated light having a width corresponding to the width of the base film WG.

When the reflected light by the reflective pattern RHOE has the same reflecting angle with the incident angle of total reflection in the high refractive film HR, the total reflection between the high refractive film HR and the low refractive film LR is repeated. As a result, any light may not be leaked out from the ultra thin light guide film LGF. Therefore, the light from the reflective pattern RHOE has an incident angle at which the total reflection of the interface between the high refractive film HR and the low refractive film LR is broken. Consequently, the reflective pattern RHOE may be preferable a holography pattern satisfying the collimation condition and the total reflection breaking condition.

Figure 8:
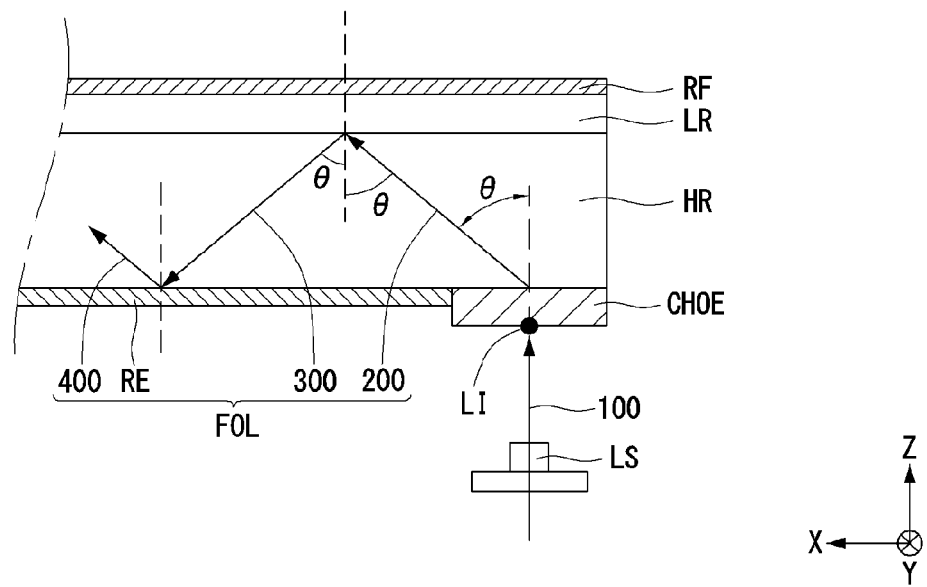
FIG. 8 is an enlarged side view illustrating a light path in which a light into an incident pattern is converted into an expanded light in the X-Z plane of the ultra thin light guide film according to one embodiment of the present invention.
Figure 9:
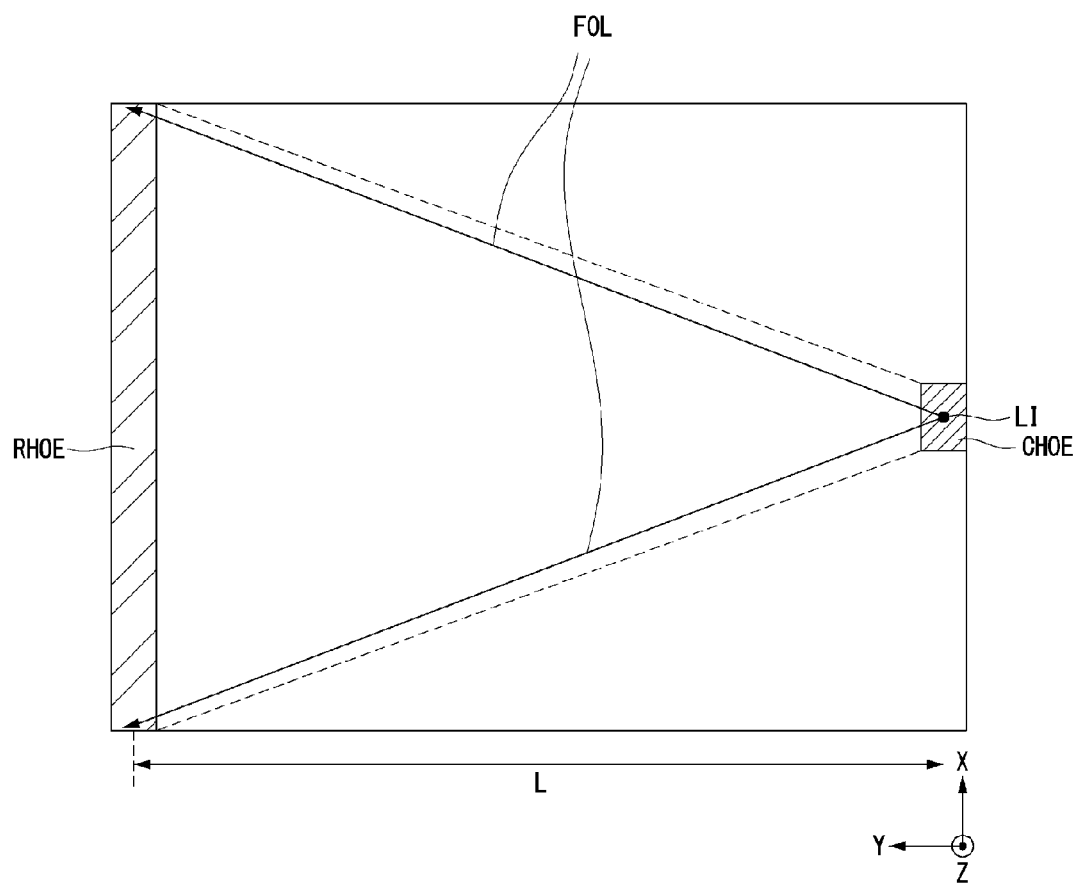
FIG. 9 is a plane view illustrating a light path of the expanded light shown in FIG. 8 in the X-Y plane of the light guide film according to one embodiment of the present invention.

Hereinafter, referring to FIGS. 8 to 11, how the light from the light source LS goes into the light guide film LGF, and how the back light is radiated from the upper surface of the ultra thin light guide film LGF, will be explained. At first, we will explain about the light path from the light source LS to the incident pattern CHOE. FIG. 8 is an enlarged side view illustrating a light path in which a light into an incident pattern is converted into an expanded light in the X-Z plane of the ultra thin light guide film according to one embodiment of the present disclosure. FIG. 9 is a plane view illustrating a light path of the expanded light shown in FIG. 8 in the X-Y plane of the light guide film according to one embodiment of the present disclosure.

Referring to FIG. 8, the incident light 100 from the light source LS enters into the incident pattern CHOE as being perpendicular to the surface of the incident pattern CHOE along the Z-axis in the X-Z plane. Further, by the holography pattern recorded at the incident pattern CHOE, the incident light 100 is refracted into the high refractive film HR which is the lower layer of the base film WG. Here, the refraction angle, θ, of the refracted light 200 is preferably larger than the critical angle of the total reflection (or TR), at the interface between the high refractive film HR and the low refractive film LR. That is, the incident pattern CHOE preferably has a holography pattern in which the refraction angle is satisfying the condition of $\theta > TR_{atHR-LR}$. For example, the incident pattern CHOE may be a holography optical film having an interference pattern recorded by using the incident light 100 as a reference beam and the refracted light 200 as an objective beam.

As a result, on the X-Z plane, the incident light 100 is converted into the refracted light 200 and then enters into the high refractive film HR. The refracted light 200 is reflected at the upper surface of the high refractive film HR and then goes again into the high refractive film HR as a total reflection light 300. The total reflection light 300 may be reflected at the bottom surface of the high refractive film HR, by the total reflection at the interface between the high refractive film HR and the air, and then goes again into the high refractive film HR as a reflected light 400. When the reflection layer RE is further included at the outer of the bottom surface of the high refractive film HR, as shown in FIG. 8, the total reflection light 300 may also be reflected by the reflection layer RE and then goes again into the high refractive film HR as a reflected light 400. Like this, the incident light 100 is converted into an expanded light FOL and goes to the reflective pattern RHOE disposed at the opposite side.

In the view of X-Y plane referring to FIG. 9, the incident light 100 which enters onto the light incident point LI of the incident pattern CHOE disposed at one side of the light guide film LGF goes to the reflective pattern RHOE as the expanded (or diversed) light FOL. For example, the incident light 100 may be a plane wave light radiated from the light source LS like a laser or a laser LED having a small cross sectional area. By the holography diffraction pattern recorded on the incident pattern CHOE, the incident light 100 may become the expanded light FOL expanded and/or diversed in accordance with the width of the reflective pattern RHOE disposed at the distance L from the one side to the opposite side. The dotted line shown in FIG. 9 preferably can mean that the light perpendicularly entering at any point onto the incident pattern CHOE is expanded corresponding to the reflective pattern RHOE.

Therefore, the holography diffraction pattern recorded on the incident pattern CHOE may satisfy the total reflection condition at the interface between the high reflective film HR and the low reflective film LR for the plane wave light, and may convert the light as being expanded and/or diffused corresponding to the width of the reflective pattern RHOE. For example, the diffractive pattern written on the incident pattern CHOE may be an interference pattern recorded using the plane wave light from the LASER or the LASER LED along the Z axis as a reference beam and the expanded light FOL having an incident angle θ to the Z axis, and expanded to the reflective pattern RHOE apart from distance, L, from the one side to the opposite side as an objective beam.

Figure 10:
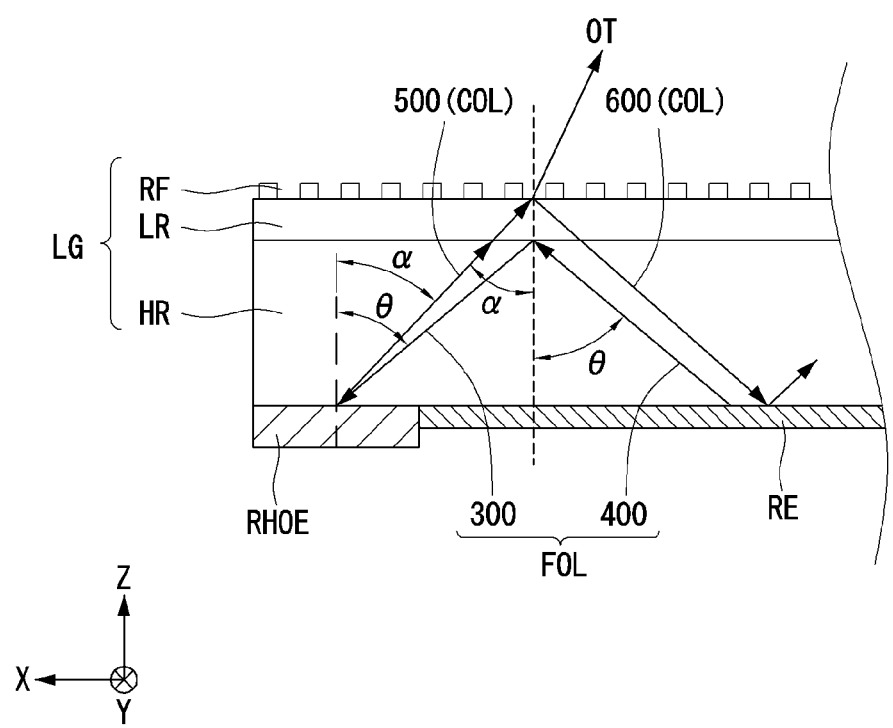
FIG. 10 is an enlarged side view illustrating a light path in which the expanded light into a reflection pattern is converted into a collimated light in the X-Z plane of the ultra thin light guide film, and goes out from the upper surface of the ultra thin light guide film according to one embodiment of the present invention.
Figure 11:
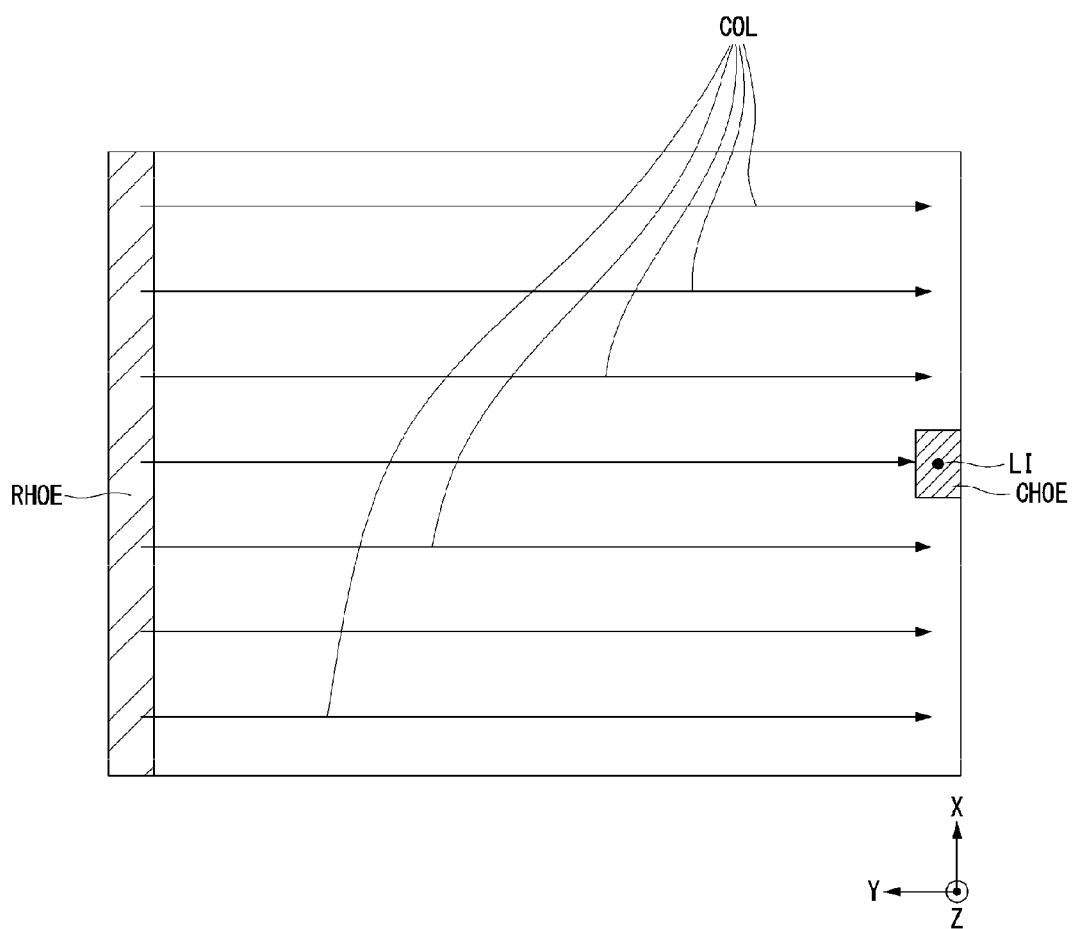
FIG. 11 is a plane view illustrating a light path of the collimated light in the X-Y plane of the light guide film, according to an embodiment of the present invention.

Hereinafter, referring to FIGS. 10 to 11, the light path by the reflective pattern RHOE, will be explained. FIG. 10 is an enlarged side view illustrating a light path in which the expanded light into a reflection pattern is converted into a collimated light in the X-Z plane of the ultra thin light guide film, and goes out from the upper surface of the ultra thin light guide film according to one embodiment of the present disclosure. FIG. 11 is a plane view illustrating a light path of the collimated light in the X-Y plane of the light guide film.

Referring to FIG. 10, the expanded light FOL enters into the reflective pattern RHOE through the high refractive film HR. In detail, the reflected light 400 by the bottom surface of the high refractive film HR or the reflection layer RE disposed under the high refractive film HR goes to the top surface of the high refractive film HR. Then, it turns into the total reflected light 300 and then enters into the high refractive film HR. It enters into the upper surface of the reflective pattern RHOE. Here, the incident angle of the expanded light FOL into the reflective pattern RHOE is larger than the critical angle for the total reflection at the interface between the high refractive film HR and the low refractive film LR. That is the incident angle of the expanded light FOL is the same with the reflection angle, θ, of the total reflected light 300.

The total reflected light 300 entering into the reflective pattern RHOE is converted into a re-reflected light 500 by the diffraction optical pattern written on the reflective pattern RHOE and then goes back into the high refractive film HR. Here, the re-reflected angle, α, would be less than the total reflection angle of the interface between the high refractive film HR and the low refractive film LR. So that, the re-reflected light 500 goes out from the high refractive film HR. The total reflection condition at the interface between the high refractive film HR and the low refractive film LR is broken. Therefore, some of the re-reflected light 500 are refracted into the low refractive film LR, others are reflected into the high refractive film HR. Here, it is preferable that the re-reflected angle, α, would be larger than the critical angle for total reflection at the upper surface of the low refractive film LR.

That is, the reflective pattern RHOE is preferable a holography pattern satisfying the condition of $TR_{atLR-air} < \alpha < TR_{atHR-LR}$. For example, the reflective pattern RHOE may be a holography film having an interference pattern written with the total reflected light 300 as a reference beam and the re-reflected light 500 as an objective beam.

In the view of X-Z plane, the total reflected light 300 is converted into the re-reflected light 500 by the reflective pattern RHOE and then goes into the high refractive film HR. The re-reflected light 500 is refracted or reflected at the upper surface of the high refractive film HR so that some enter into the low refractive film LR and others enter into the high refractive film HR. Actually, there are very complex optical phenomena at the upper surface of the high refractive film HR. For convenience of explanation, it is treated as the total reflection is broken at the upper surface of the high refractive film HR and all lights goes into the low refractive film LR. Further, the all lights going into the low refractive film LR is actually refracted, but in figures the refracted light path is not shown, because the refracted angle has no important meaning when the thickness of the low refractive film LR is very thin.

The re-reflected light 500 again entering into the low refractive film LR is converted as a re-entering light 600. The re-reflected light 500 is total reflected at the upper surface of the low refractive film LR, the interface between the low refractive film LR and the air. Of course, the re-entering light 600 is refracted and reflected at the interface between the high refractive film HR and the low refractive film LR. Here, in convenience, we treat as the re-entering light 600 is shown as entering into the high refractive film HR.

That is, the re-reflected light 500 by the reflective pattern RHOE is total reflected at the upper surface of the low refractive film LR and then converted into the re-entering light 600 entering into the low refractive film LR and the high refractive film HR. After that, the re-entering light 600 is again reflected by the bottom surface of the high refractive film HR and then is converted into the re-reflected light 500. Consequently, the re-reflected light 500 goes to the one side from the opposite side. Doing so, the light reflected by the reflective pattern RHOE is propagated to the one side where the light source LS is disposed.

During the above mentioned processes, for the case that a light radiating pattern RF such as a grating pattern is disposed on the upper surface of the low refractive film LR, some of the re-reflected light 500 are total reflected by the upper surface of the low refractive film LR and others of the re-reflected light 500 proportional to the diffractive efficiency of the light radiating pattern RF go out from the low refractive film LR so that they are radiated to the display panel LCP as the back light OT. For example, when the diffractive efficiency of the light radiating pattern RF is 5%, the 5% of the re-reflected light 500 would be the back light OT radiated outside of the ultra thin light guide film LGF. The 95% of the re-reflected light 500 would be total reflected as the re-entering light 600 and then goes back into the ultra thin light guide film LGF. Next, among 95% of the re-reflected light 500, the 5% would be the back light OT radiated outside of the ultra thin light guide film LGF, and 95% would go back into the ultra thin light guide film LGF. Repeating these processes, the back light OT is radiated from the upper surface of the ultra thin light guide film LGF.

Further, it is preferable that the light radiating pattern RF may be a holography pattern by which the back light OT is radiated out of the surface of the light guide film LGF. As shown in FIG. 10, the re-reflected light 500 has an incident angle to the Z axis and goes out from the upper surface of the low refractive film LR. Here, it is preferable that the holography pattern makes the radiating direction of the back light OT close to the Z axis as possible. For the case that the light radiating pattern RF is a grating pattern, the material for the grating pattern would have a characteristics for making the radiating direction of the back light OT close to the Z axis.

Further, the re-reflected light 500 and the re-entering light 600 would propagate through the ultra thin light guide film LGF as the collimated lights. For example, as shown in FIG. 11 on the X-Y plane, the reflected light by the reflective pattern RHOE is preferably a collimated light COL propagating from the opposite side to the one side of the light guide film LGF.

Consequently, the holography pattern recorded on the reflective pattern RHOE may include a diffraction pattern by which the expanded light FOL is total reflected at the interface between the low refractive film LR and the air and is converted into a collimated light covering the width of the light guide film LGF. For example, the diffraction pattern recorded on the reflective pattern RHOE may be an interference pattern using the expanded light FOL as a reference beam and the collimated light COL as an objective beam. It is preferable that the expanded light FOL is expanded as corresponding to the width of the reflective pattern RHOE and has an incident angle of θ, and the collimated light COL has a refraction angle of α to the Z axis and covers the width of the ultra thin light guide film LGF (or reflective pattern RHOE).

In one embodiment of the present disclosure mentioned above, the incident light 100 passing the incident pattern CHOE can enter into the high refractive film HR by refracted by the incident pattern CHOE with the angle larger than the total reflection angle at the interface between the high refractive film HR and the low refractive film LR. However, in actual condition, this result cannot be ensured at any time. For example, when the light source LS generating the incident light 100 is not the ideal point light source but a light emitting diode which has divergence property, all of the incident light 100 may not be radiated on the center point of the incident pattern CHOE, the incident point LI. In this case, unwanted light leakage may be occurred. In order to prevent the light leakage, we suggest another embodiment of the present disclosure, as follows.

Figure 16:
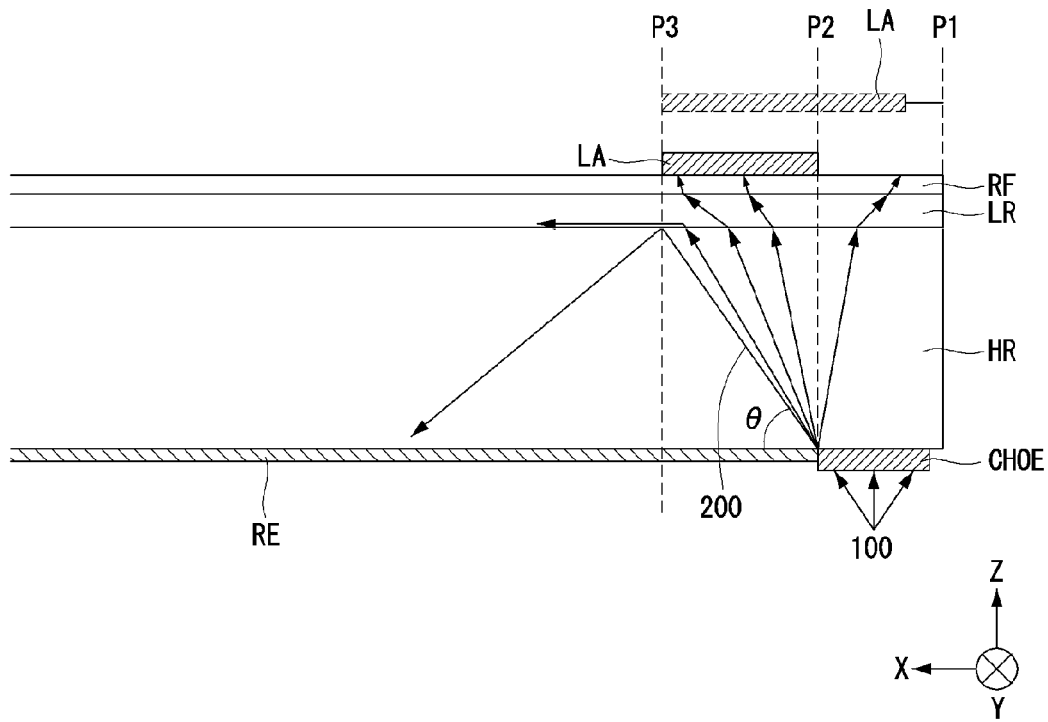
FIG. 16 is an enlarged side view illustrating a structure of an ultra thin light guide film according to another embodiment of the present invention.
Figure 17:
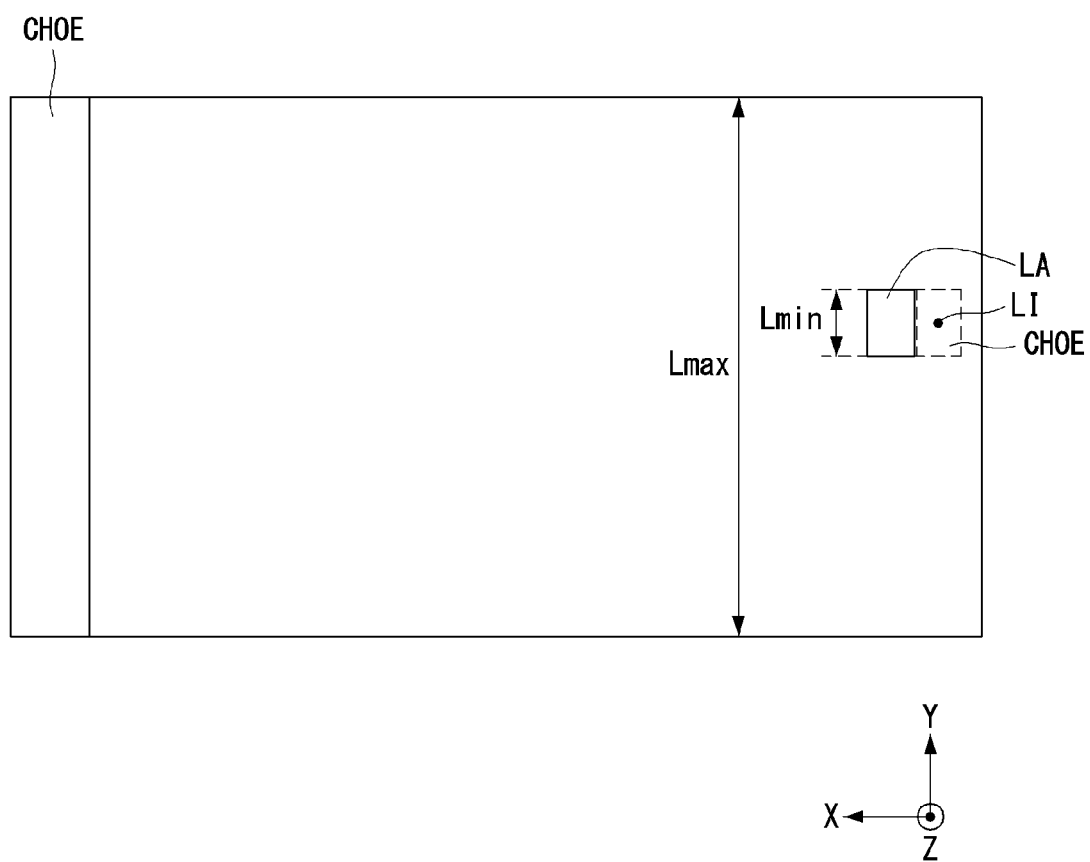
FIG. 17 is a plane view illustrating the structure of the ultra thin light guide film, shown in FIG. 16 according to another embodiment of the present invention.

Hereinafter, referring to FIGS. 16 and 17, another embodiment of the present disclosure will be explained. FIG. 16 is an enlarged side view illustrating a structure of an ultra thin light guide film according to another embodiment of the present disclosure. FIG. 17 is a plane view illustrating the structure of the ultra thin light guide film, shown in FIG. 16 according to another embodiment of the present disclosure.

The ultra thin film type light guide film according to another embodiment of the present disclosure comprises a light absorbing pattern LA in addition to the ultra thin film type light guide film LGF explained in the FIGS. 5 to 9 according to one embodiment of the present disclosure. Referring to FIG. 16, all incident lights 100 are not radiated onto the center point of the incident pattern CHOE but some of the incident lights 100 are radiated on the circumference areas of the incident pattern CHOE. In that case, the incident lights 100 may not be refracted with a refraction angle which is smaller than the total reflection angle at the interface between the high refractive film HR and the low refractive film LR. As a result, some of refracted lights 200 entering into the high refractive film HR with the refracted angle smaller than the total reflection angle may enter into the low refractive film LR, so that some of them may go out of the low refractive film LR through the light radiating pattern RF. In order to block these light leakages occurred over the incident pattern CHOE, the light absorbing pattern LA may be disposed on the light radiating pattern RF over the incident pattern CHOE.

Referring to FIG. 16, it is preferable that the inner end side of the light absorbing pattern LA may be placed at the point P3 where the refracted light 200 with the refraction angle equal to the total reflection angle at the interface between the high refractive film HR and the low refractive film LR may hit. Further, it is preferable that the outer end side of the light absorbing pattern LA may be placed at any point between the point P1 and point P2. Here, the point P1 is the end side of the high refractive film HR, and the point P2 is corresponding to the inner end side of the incident pattern CHOE. In other words, it is preferable that the width of the light absorbing pattern LA has the minimum width corresponding to the distance between the point P2 and the point P3, and the maximum width corresponding to the distance between the point P1 and the point P3.

Referring to FIG. 17, the length of the light absorbing pattern LA preferably has the minimum length corresponding to the length of the incident pattern CHOE. Further, the maximum length of the light absorbing pattern LA is preferably corresponding to the width of the high refractive film HR.

Displacing the light absorbing pattern LS as shown in FIGS. 16 and 17, it is possible to block and/or absorb the leaked lights caused by the refracted light 200 of which refraction angle is smaller than the total reflection angle at the upper surface of the high refractive film HR. As a result, the light guide film according to another embodiment can use only the lights satisfying the total reflection condition so that it can suggest the back light without any light leakage.

The back light unit according to the present disclosure may include the light source LS with at least required number. Further, it includes an ultra thin film type light guide film LGF having a high refractive film HR and a low refractive film LR stacked each other, an incident pattern CHOE attached on one side and a reflection pattern RHOE attached on other side. Disposing the light source LS under the bottom surface of the light guide film LGF, it is possible to minimize the thickness of the back light unit BLU. In addition, the most elements of the back light unit is formed as the thin film type, it is possible to develop a flexible back light unit which can be applied to the flexible display.

Especially, the present disclosure uses the holography technology so that it can provide a back light collimated in parallel with the radiating direction with a cross sectional area corresponding to the surface of the light guide film LGF. Further, disposing a holographic film HOE defining the viewing window of the back light over the light guide film, it can be applied various types of display such as the non-glasses type display or the multi-view display.

Figure 12:
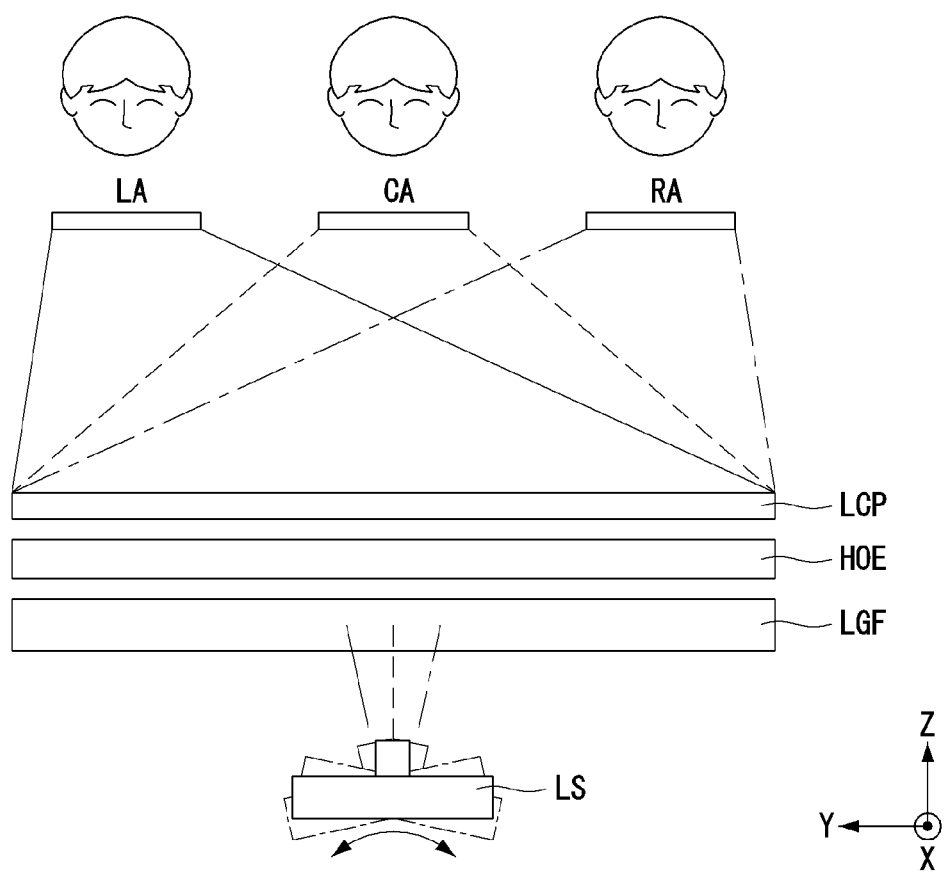
FIG. 12 is a side view illustrating a structure of the controlled viewing-window display in Y-Z plane using the light guide film shown in FIG. 7 according to the present invention.

Hereinafter, the multi-view display in which the ultra thin film type back light unit according to the present disclosure is applied, will be explained. Referring to FIGS. 4 and 12, the method for controlling the propagation direction of the back light by tilting the status of the light source LS to change the incident angle of the incident light onto the incident point, will be explained. FIG. 12 is a side view illustrating a structure of the controlled viewing-window display in Y-Z plane using the light guide film shown in FIG. 7 according to the present disclosure.

Under the bottom surface of the light guide film LGF, a light source LS providing an incident light 100. The light source LS may provide an incident light 100 along to the Z-axis, perpendicularly to the surface of the incident pattern CHOE on the incident point LI. In that case, by the holographic film HOE disposed over the light guide film LGF, the viewing-window can be controlled, and then the back light may be radiated within a predetermined window area at the center portion of the display. That is, the video images represented on the display panel LCP can be detected or observed at the center area CA only where the back light is radiated.

In the interim, when tilting the light source LS to the left direction on the Y-Z plane with a predetermined angle to provide the incident light 100 to the incident pattern CHOE of the light guide film LGF, the back light may be radiated on the left area LA shifted to the left direction from the center area CA. Here, the shifting amount of the back light may be controlled by the tilting angle of the light source LS, that is the incident angle on the Y-Z plane. With the similar method, when tilting the light source LS to the right direction on the Y-Z plane with a predetermined angle to provide the incident light 100 to the incident pattern CHOE of the light guide film LGF, the back light may be radiated on the right area RA shifted to the right direction from the center area CA.

When the display panel LCP represents three different video images, by controlling the tilting angle of the light source LS synchronizing with the frame period of each image, it is possible to suggest three video images to different three persons, respectively. For example, when the display panel LCP represent the first video image for center area CA, the light source LS may be controlled as to radiate the incident light 100 perpendicular to the surface of the incident pattern CHOE, so that the first video image can be detected at the center area CA only. When the display panel LCP represent the second video image for left area LA, the light source LS may be controlled as to radiate the incident light 100 by being left tilted to the normal line of the incident pattern CHOE, so that the second video image can be detected at the left area LA only. Further, when the display panel LCP represent the third video image for right area LA, the light source LS may be controlled as to radiate the incident light 100 by being right tilted to the normal line of the incident pattern CHOE, so that the third video image can be detected at the right area RA only.

Figure 13:
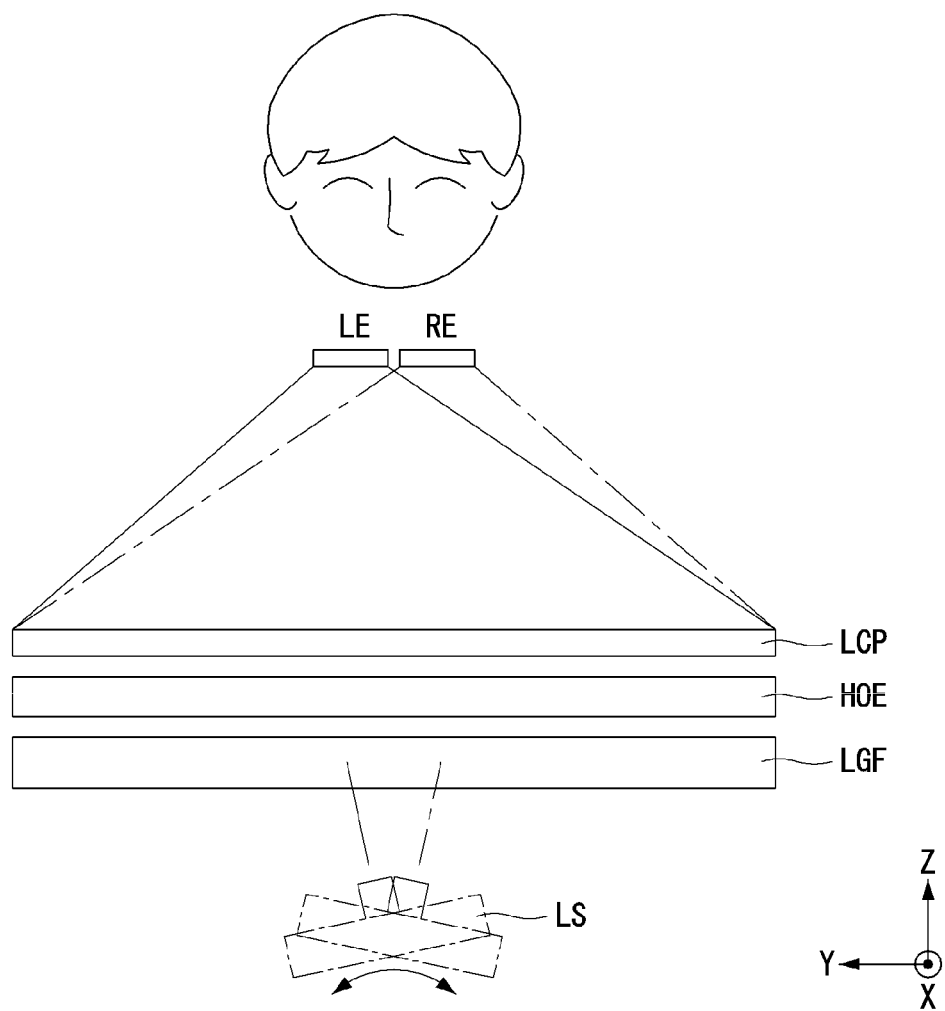
FIG. 13 is a side view illustrating a structure of the first example for the non-glasses type 3D display in Y-Z plane using the light guide film shown in FIG. 7 according to the present invention.

Hereinafter, we will explain about the non-glasses type display in which the ultra thin film type back light unit according to the present disclosure is applied. There are various types of holographic 3D display. For the first example for the non-glasses type 3D display, referring to FIGS. 4 and 13, the method for controlling the propagation direction of the back light by tilting the status of the light source LS to change the incident angle of the incident light onto the incident point, will be explained. FIG. 13 is a side view illustrating a structure of the first example for the non-glasses type 3D display in Y-Z plane using the light guide film shown in FIG. 7 according to the present disclosure.

Under the bottom surface of the light guide film LGF, a light source LS providing an incident light 100. Between the light guide film LGF and the display panel LCP, a holographic film HOE for controlling the viewing-window is disposed. Here, it is preferable that the size of the viewing-window controlled by the holographic film HOE may be corresponding to the width of the one human eye.

When tilting the light source LS to the left direction on the Y-Z plane with a predetermined angle to provide the incident light 100 to the incident pattern CHOE of the light guide film LGF, the back light may be radiated on the left eye area LE shifted to the left direction from the vertical center line. Here, the shifting amount of the back light may be controlled by the tilting angle of the light source LS, that is the incident angle on the Y-Z plane. With the similar method, when tilting the light source LS to the right direction on the Y-Z plane with a predetermined angle to provide the incident light 100 to the incident pattern CHOE of the light guide film LGF, the back light may be radiated on the right eye area RE shifted to the right direction from the vertical center line.

When the display panel LCP represents the left eye images, by tilting the light source LS to the left direction, the left images can be provided only on the left eye area LE of the observer. When display panel LCP represents the right eye images, by tilting the light source LS to the right direction, the right images can be provided only on the right eye area RE of the observer.

Even though not shown in the figures, for another application of the first example for the non-glasses type 3D display, the individual light sources may be included for each eye area. For example, a left eye light source and a right eye light source may be included. The left eye light source may be installed as being left tilted from the Z axis in the Y-Z plane with a predetermined angle. The right eye light source may be installed as being right tilted from the Z axis in the Y-Z plane with a predetermined angle. In this case, when display panel LCP represents the left eye images, the left eye light source turns on only. When display panel LCP represents the right eye images, the right eye light source turns on only. So that, the non-glasses type 3D display can be implemented.

When implementing the 3D display, according to the numbers of the observers and the distances between the screen and observer, the left eye area and the right eye area may be differently defined. Therefore, it is preferable that the left light source for the left eye images and the right light source for the right eye images are separately prepared. So that, the optimized viewing-window for the left eye images and the optimized viewing-window for the right eye images can be properly changed according to the conditions of the observers. In this aspect, another application of the first example for the non-glasses type 3D display may be further preferred because the tilting angle can be quickly changed according to the conditions for providing the optimized viewing-window.

Figure 14:
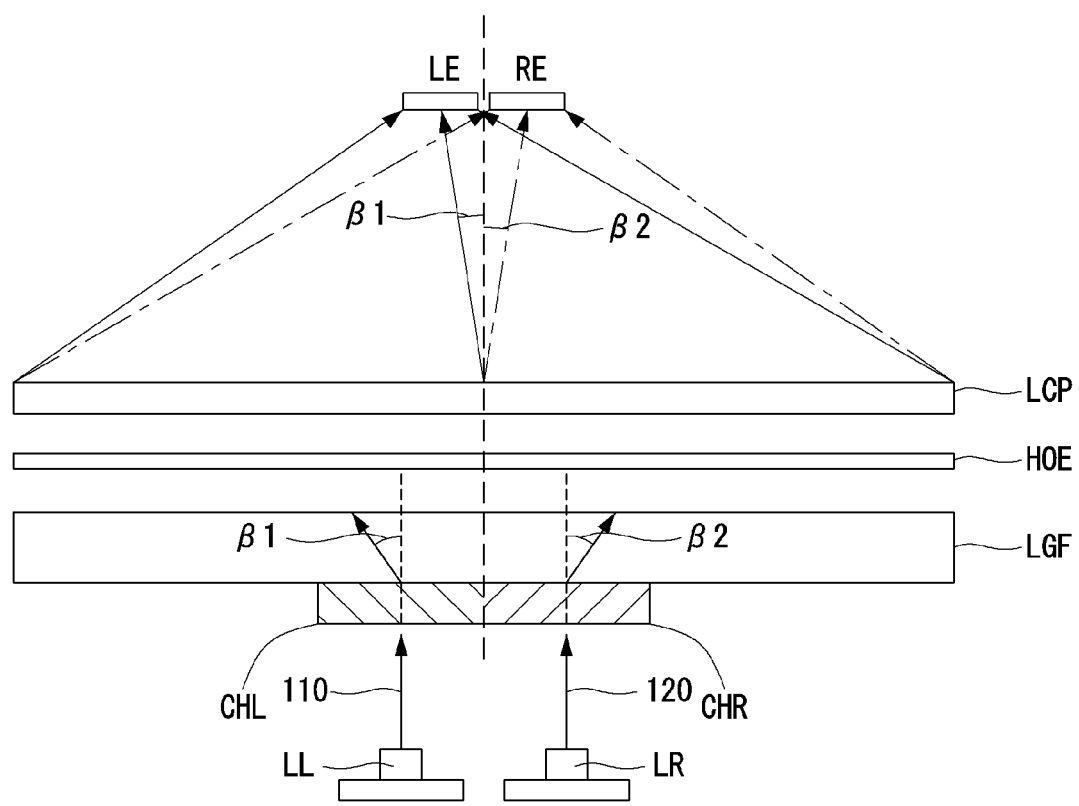
FIG. 14 is a side view illustrating a structure of the second example for the non-glasses type 3D display in Y-Z plane using the light guide film shown in FIG. 7 according to the present invention.

For the second example for the non-glasses type 3D display, a plurality of light sources depending to the viewing-windows are included, and a plurality of incident patterns corresponding to each light source are included for providing a plurality of back lights as having different radiating direction. FIG. 14 is a side view illustrating a structure of the second example for the non-glasses type 3D display in Y-Z plane using the light guide film shown in FIG. 7 according to the present disclosure.

In the second example for the non-glasses type 3D display, the different kinds of video images (the left eye images and the right eye images) may be represented to the different directions, respectively. Therefore, a plurality of light sources and a plurality of the incident patterns corresponding to the number of the different kinds of the video images are included. In detail, when the number of the kinds of the video images is 'n', then n light sources and n incident patterns are included. Hereinafter, we explain about the non-glasses 3D display so the kinds of the video images are 2, one is the left eye video image and the other is the right eye video image. That is, n is 2. Of course, this can be applied to the multi-view display where n is greater than 2.

Referring to FIG. 14, the light guide film LGF comprises a left incident pattern CHL and a right incident pattern CHR disposed under the bottom surface of the high refractive film HR. Under the light guide film LGF, a left light source LL for providing the left incident light 110 to the left incident pattern CHL and a right light source RL for providing the right incident light 120 to the right incident pattern CHR are disposed. Between the light guide film LGF and the display panel LCP, a holographic film HOE for controlling the viewing-window may be disposed. Here, it is preferable that the size of the viewing-window controlled by the holographic film HOE may be corresponding to the width of the one human eye.

The left light source LL may provide the left incident light 110 as being perpendicular to the surface of the left incident pattern CHL. Also, the right light source RL may provide the right incident light 120 as being perpendicular to the surface of the right incident pattern CHR. The holographic diffraction pattern recorded at the left incident pattern CHL may have the function as expanding and/or diversing the left incident light 110 to the width corresponding to the reflection pattern RHOE and as refracting the left incident light 110 satisfying the total reflection condition at the interface between the high refractive film HR and the low refractive film LR. Further, the left incident light 110 may be refracted in Y-Z plane with a first deflection angle β1 after passing the left incident pattern CHL. In detail, the diffractive pattern written on the left incident pattern CHL may be an interference pattern recorded using the plane wave light from the laser or the laser LED along the Z axis as a reference beam and the expanded light FOL having an incident angle θ and the first deflection angle β1 to the Z axis, and expanded to the reflective pattern RHOE apart from distance, L, from the one side to the opposite side as an objective beam.

The left incident light 110 is parallel to the Z axis in the X-Z plane, but it has the first deflection angle β1 in the Y-Z plane. As a result, when being re-reflected by the reflection pattern RHOE and going out from the light radiating pattern RF, the back light may have the first deflection angle β1 from the Z axis in the Y-Z plane. After that, the back light may be radiated within the left eye area LE which is the left controlled viewing-window by the holographic film HOE.

The holographic diffraction pattern recorded at the right incident pattern CHR may have the function as expanding and/or diversing the right incident light 120 to the width corresponding to the reflection pattern RHOE and as refracting the right incident light 120 satisfying the total reflection condition at the interface between the high refractive film HR and the low refractive film LR. Further, the right incident light 120 may be refracted in Y-Z plane with a second deflection angle β2 after passing the right incident pattern CHR. In detail, the diffractive pattern written on the right incident pattern CHR may be an interference pattern recorded using the plane wave light from the laser or the laser LED along the Z axis as a reference beam, and the expanded light FOL having an incident angle θ and the second deflection angle β2 to the Z axis, and expanded to the reflective pattern RHOE apart from distance, L, from the one side to the opposite side as an objective beam.

The right incident light 120 is parallel to the Z axis in the X-Z plane, but it has the second deflection angle β2 in the Y-Z plane. As a result, when being re-reflected by the reflection pattern RHOE and going out from the light radiating pattern RF, the back light may have the second deflection angle β2 from the Z axis in the Y-Z plane. After that, the back light may be radiated within the right eye area RE which is the right controlled viewing-window by the holographic film HOE.

When the display panel LCP represents the left eye images, the left light source LL may turn on only. When the display panel LCP represents the right eye images, the right light source RL may turn on only. Therefore, the left eye images and the right eye images are separately provided to the left eye area LE and the right eye area RE of the observer, respectively. This 3D display system is the non-glasses 3D display system which does not required the shutter glasses or the polarization glasses.

Using the controlled viewing-window back light unit according to the present disclosure, the multi-view display and/or the non-glasses type 3D display can be developed. For these specific purposed displays, it is preferable that the general mode and the specific mode can be switchable. For example, for the 3D display, it is preferable that the user can select whether he/she uses the display in 3D mode or in 2D mode freely.

Figure 15:
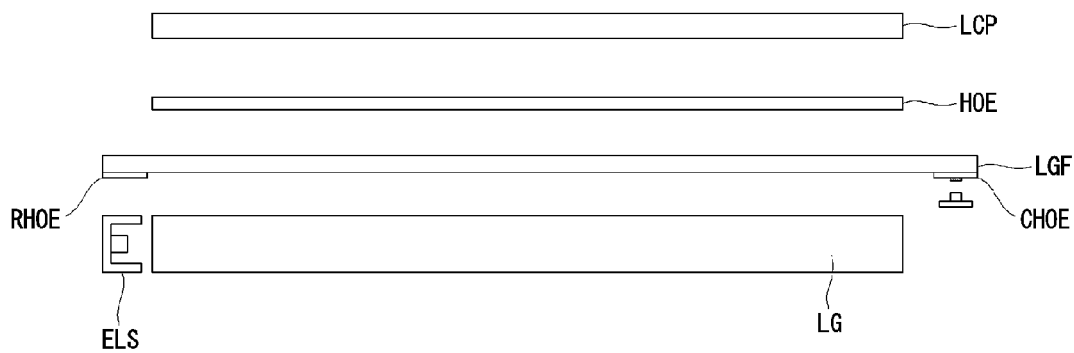
FIG. 15 is a side view illustrating a structure of the non-glasses 3D display in X-Z plane which includes a 3D back light unit using the light guide film according to FIG. 7 and a 2D back light unit having a light guide panel and an edge type light source under the 3D back light unit for selecting the 2D mode and the 3D mode.

Hereinafter, we explain how to select the general mode and the specific mode in the present disclosure. As mentioned in explanation of FIG. 4, using the diffusion sheet DIF, the general mode and the specific mode (the controlled viewing-window mode) can be selected according to the user's needs. Referring to FIG. 15, another example will be explained. FIG. 15 is a side view illustrating a structure of the non-glasses 3D display in X-Z plane which includes a 3D back light unit using the light guide film according to the FIG. 7 and a 2D back light unit having a light guide panel and an edge type light source under the 3D back light unit for selecting the 2D mode and the 3D mode.

Referring to FIG. 15, the display according to an applicable example of the present disclosure comprises a flat type display panel LCP providing a 2D video images/information in the general mode and a specific video images/information in the controlled viewing-window mode, selectively. Under the flat type display panel LCP, a controlled viewing-window back light unit according to the present disclosure is included. The controlled viewing-window back light unit according to the present disclosure includes a holographic film HOE for a controlling the viewing-window, a light guide film LGF disposed under the holographic film HOE and a light source for a controlling the viewing-window. As we explained about the controlled viewing-window back light unit according to the present disclosure, the same explanation will not be duplicated.

Under the controlled viewing-window back light unit according to the present disclosure may further comprise an edge type back light unit used for general mode, 2D mode. The edge type back light unit includes a light guide panel LG and an edge type light source ELS disposed at one side of the light guide panel LG. The light guide panel LG may have the shape and size corresponding to those of the display area of the flat type display panel LCP.

The light guide panel LG may be corresponding to the center portion of the light guide film LGF except for the some areas of both side portions where the incident pattern CHOE and the reflection pattern RHOE are disposed. Further, it is preferred that the edge type light source ELS is disposed as not overlapping with the light source LS for the controlled viewing-window. As the light source LS for the controlled viewing-window is disposed under the incident pattern CHOE of the light guide film LGF, the edge type light source ELS may be disposed at any one side among the three sides not having the incident pattern CHOE. FIG. 15 shows the case in that the edge type light source ELS is disposed under the reflection pattern RHOE.

The most portions of the light guide film LGF according to the present disclosure preferably have the transparent property except for the incident pattern CHOE and the reflection pattern RHOE. Therefore, when the edge type back light unit is working, the back lights from the edge type back light unit just pass the light guide film LGF so that the display panel can be used in the 2D mode. Even though the holographic film HOE for the controlled viewing-window is disposed on the light guide film LGF, the back lights from the edge type back light unit are not affected by the holographic film HOE so that they will be passing through as they are.

When the flat type display panel LCP represents the 2D mode video images/information, the edge type back light should be activated so that the display can be operated in the general mode. When the flat type display panel LCP represents the specific video images/information such as the 3D images or the multi-view images, the controlled viewing-window back light unit should be activated so that the display can be operated in the specific mode.

While the embodiments of the present invention have been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A back light unit comprising:
   a base film having a width and a length, and including a high refractive film and a low refractive film stacked on the high refractive film;
   an incident pattern disposed at one side of a bottom surface of the base film;
   a reflective pattern disposed at an opposite side apart from the one side with the length of the bottom surface of the base film, and covering the width of the opposite side;
   a light radiating pattern disposed on an upper surface of the base film;
   a light source being apart from the incident pattern, and providing an incident light to the incident pattern; and
   a light absorbing pattern disposed over the light radiating pattern at the one side where the incident pattern is located,
   wherein an inner end side of the light absorbing pattern is positioned where a refraction angle of the incident light equals to a total reflection angle at an interface between the high refractive film and the low refractive film, and
   wherein an outer end side of the light absorbing pattern is positioned between an inner end side of the incident pattern and an outer end of the high refractive film.

2. The back light unit according to claim 1, wherein the light source is configured to be tilted for selecting one incident angle among a plurality of inclined angles to the incident light perpendicularly entering the incident pattern.

3. The back light unit according to claim 1, wherein the light source includes n light sources, in which each of the n light sources providing the incident light perpendicularly entering the incident pattern, respectively, and
   wherein the incident pattern includes n incident patterns, in which each of the n incident patterns has an incident point corresponding to the each of the n light sources, respectively, and in which each of the incident patterns refracts each incident light perpendicularly entering the incident pattern to a deflected angle.

4. The back light unit according to claim 1,
   wherein a length of the light absorbing pattern is adapted to a length of the incident pattern.

5. A controlled viewing-window display comprising:
   a flat display panel; and
   a back light unit including:
   a light source disposed at a rear side of the flat display panel;
   a light guide film disposed between the light source and the flat display panel as facing to the flat display panel, and converting an incident light entering into an incident point from the light source into a back light covering an entire surface of the flat display panel; and a holographic film controlling an optical property of the back light unit from the light guide film, wherein the light guide film includes:

a base film having a width and a length, and including a high refractive film and a low refractive film stacked on the high refractive film;

an incident pattern disposed at one side of a bottom surface of the base film;

a reflective pattern disposed at an opposite side apart from the one side with the length of the bottom surface of the base film, and covering the width of the opposite side;

a light radiating pattern disposed on an upper surface of the base film; and a light absorbing pattern disposed over the light radiating pattern at the side where the incident pattern is located, wherein the light source provides the incident light to the incident pattern, wherein an inner end side of the light absorbing pattern is positioned where a refraction angle of the incident light equals to a total reflection angle at an interface between the high refractive film and the low refractive film, and wherein an outer end side of the light absorbing pattern is positioned between an inner end side of the incident pattern and an outer end of the high refractive film.

6. The controlled viewing-window display according to claim 5, wherein the incident pattern includes a holography pattern configured to convert the incident light into an expanded light, wherein the incident light perpendicularly enters onto a surface of the incident pattern, and wherein the expanded light has a refraction angle larger than a critical angle for total reflection at the interface between the high refractive film and the low refractive film, and is expanded corresponding to the width.

7. The controlled viewing-window display according to claim 6, wherein the reflective pattern includes a holography pattern configured to convert the expanded light into a collimated light which has a reflection angle smaller than the refraction angle and larger than a critical angle of total reflection at an interface between the low refraction film and an air, and covers the width.

8. The controlled viewing-window display according to claim 7, wherein some portions of the collimated light are diffracted by the light radiating pattern, including a holographic pattern, and are radiated outward from the low refractive film into free space.

9. The controlled viewing-window display according to claim 8, wherein the light source is configured to be tilted for selected one incident angle among a plurality of inclined angles to the incident light perpendicularly entering the surface of the incident pattern.

10. The controlled viewing-window display according to claim 8, wherein the light source includes n light sources, in which each of the n light sources providing the incident light perpendicularly entering the surface of the incident pattern, respectively, and wherein the incident pattern includes n incident patterns, in which each of the n incident patterns has an incident point corresponding to the each of the n light sources, respectively, and in which each of the incident patterns diffracts each incident light perpendicularly entering the surface of the incident pattern to a deflected angle.

11. The controlled viewing-window display according to claim 5, wherein a length of the light absorbing pattern is adapted to a length of the incident pattern.

12. The controlled viewing-window display according to claim 5, further comprising:

a selective diffuser sheet disposed at either between the holographic film and the flat display panel or between the holographic film and the light guide film.

13. The controlled viewing-window display according to claim 5, further comprising:

a light guide panel disposed under the light guide film; and an edge type light source disposed at one side of the light guide panel.

14. A back light unit comprising:

a base film having a high refractive film and a low refractive film stacked on the high refractive film;

an incident pattern disposed at one side of a lower surface of the base film;

a reflective pattern disposed at the lower surface of the base film and at an opposite side of the incident pattern;

a light radiating pattern formed on an upper surface of the base film;

a light source configured to provide an incident light to the incident pattern; and a light absorbing pattern disposed on the light radiating pattern, and formed between the incident pattern and the reflective pattern, wherein an inner end side of the light absorbing pattern is positioned where a refraction angle of the incident light equals to a total reflection angle at an interface between the high refractive film and the low refractive film, and wherein an outer end side of the light absorbing pattern is positioned between an inner end side of the incident pattern and an outer end of the high refractive film.

15. The back light unit of claim 14, wherein the light source is configured to tilt an angle of the incident light to the incident pattern.

16. The back light unit of claim 14, wherein the light absorbing pattern is configured to have a minimum length corresponding to a length of the incident pattern and a maximum length corresponding to a width of the base film.

* * * * *